US011942029B2

(12) United States Patent
Yu et al.

(10) Patent No.: US 11,942,029 B2
(45) Date of Patent: Mar. 26, 2024

(54) DISPLAY DEVICE AND METHOD OF DRIVING THE SAME

(71) Applicants: Samsung Display Co., LTD., Yongin-si (KR); IUCF-HYU (Industry-University Cooperation Foundation Hanyang University), Seoul (KR)

(72) Inventors: Byungchang Yu, Yongin-si (KR); Oh-Kyong Kwon, Seoul (KR); Kyunghoon Chung, Yongin-si (KR)

(73) Assignees: SAMSUNG DISPLAY CO., LTD., Gyeonggi-do (KR); IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 0 days.

(21) Appl. No.: 18/203,158

(22) Filed: May 30, 2023

(65) Prior Publication Data

US 2024/0038145 A1 Feb. 1, 2024

(30) Foreign Application Priority Data

Aug. 1, 2022 (KR) ........................ 10-2022-0095731

(51) Int. Cl.
*G09G 3/32* (2016.01)

(52) U.S. Cl.
CPC ....... *G09G 3/32* (2013.01); *G09G 2310/0267* (2013.01); *G09G 2310/0275* (2013.01); *G09G 2320/0247* (2013.01)

(58) Field of Classification Search
CPC ............. G09G 2310/0267; G09G 3/32; G09G 2320/0247; G09G 2310/0275
See application file for complete search history.

(56) References Cited

U.S. PATENT DOCUMENTS 8,797,314 B2 8/2014 Chung et al.
9,460,662 B2 10/2016 Lee et al.
(Continued)

FOREIGN PATENT DOCUMENTS

KR 101058116 B1 8/2011
KR 102023232 B1 9/2019
(Continued)

OTHER PUBLICATIONS

Lin et al., Pixel Circuit With Leakage Prevention Scheme for Low-Frame-Rate AMOLED Displays, in IEEE Journal of theElectron Devices Society, vol. 8, pp. 235-240, 2020.
(Continued)

*Primary Examiner* — Muhammad N Edun
(74) *Attorney, Agent, or Firm* — CANTOR COLBURN LLP

(57) ABSTRACT

A display device includes a pixel. The pixel includes a light-emitting element, a first capacitor, and first to fifth transistors. The first transistor is connected between a first voltage line receiving a first driving voltage and the light-emitting element, and operates in response to a potential of a first node, and the second transistor is connected between a data line and the first node, and receives a first scan signal. The first capacitor is connected between the first node and a second node, and the third transistor is connected between the first transistor and the first node, and receives a second scan signal. The fourth transistor is connected between a reference voltage line and the first node, and receives a third scan signal, and the fifth transistor is connected between the first transistor and the second node, and receives an emission control signal.

20 Claims, 20 Drawing Sheets

(56) References Cited

U.S. PATENT DOCUMENTS

| | | | | |
|---|---|---|---|---|
| 9,917,272 | B2 | 3/2018 | Voges et al. | |
| 11,195,474 | B2 | 12/2021 | Yoo et al. | |
| 2014/0362063 | A1* | 12/2014 | Uchino | G09G 3/3258 345/205 |
| 2017/0193918 | A1* | 7/2017 | Bae | G09G 3/3291 |
| 2017/0287996 | A1* | 10/2017 | Kim | H10K 59/1213 |
| 2022/0230597 | A1* | 7/2022 | Liu | H05B 45/335 |

FOREIGN PATENT DOCUMENTS

| | | | |
|---|---|---|---|
| KR | 102185361 | B1 | 12/2020 |
| KR | 1020210017876 | A | 2/2021 |

OTHER PUBLICATIONS

M. Choi et al., A Self-compensated Voltage Programming Pixel Structure for Active-Matrix Organic Light Emitting Diodes, IDW Tech. Digest, 535-538 (2003).

N. Keum, S. et al., An AMOLED Pixel Circuit With a Compensating Scheme for Variations in Subthreshold Slope and Threshold Voltage of Driving TFTs, in IEEE Journal ofSolid-State Circuits, vol. 55, pp. 3087-3096, 2020.

* cited by examiner

DISPLAY DEVICE AND METHOD OF DRIVING THE SAME

This application claims priority to Korean Patent Application No. 10-2022-0095731, filed on Aug. 1, 2022, and all the benefits accruing therefrom under 35 U.S.C. § 119, the content of which in its entirety is herein incorporated by reference.

BACKGROUND

1. Field

Embodiments of the disclosure described herein relate to a display device and a driving method of the same, and more particularly, relate to a display device having uniform emission characteristics and a method of driving the display device.

2. Description of the Related Art

Among display devices, a light-emitting display device displays an image using a light-emitting diode that generates light by recombination of electrons and holes. Such a light-emitting display device has an advantage in that it has a fast response speed and is driven with relatively low power consumption.

The light-emitting display device includes pixels connected to data lines and scan lines. The pixels generally include a light-emitting diode and a circuit unit for controlling an amount of current flowing to the light-emitting diode. The circuit unit controls the amount of current flowing from a first driving voltage to a second driving voltage through the light-emitting diode in response to a data signal. In this case, light having a preset luminance is generated in response to the amount of current flowing through the light-emitting diode.

SUMMARY

Embodiments of the disclosure provide a display device and a method of driving the display device having uniform light emission characteristics even when a driving frequency is changed.

In an embodiment of the disclosure, a display device includes a display panel including a pixel, and a panel driver driving the display panel.

The pixel includes a light-emitting element, a first transistor, a second transistor, a first capacitor, a third transistor, a fourth transistor, a fifth transistor, a sixth transistor, and a seventh transistor. The first transistor is connected between a first voltage line receiving a first driving voltage and the light-emitting element, and operates in response to a potential of a first node, and the second transistor is connected between a data line and the first node, and receives a first scan signal. The first capacitor is connected between the first node and a second node, and the third transistor is connected between the first transistor and the first node, and receives a second scan signal. The fourth transistor is connected between a reference voltage line receiving a reference voltage and the first node, and receives a third scan signal, and the fifth transistor is connected between the first transistor and the second node, and receives an emission control signal. The sixth transistor is connected between the first voltage line and the third node, and receives a fourth scan signal, and the seventh transistor is connected between the first node and the third transistor, and receives a fifth scan signal.

In an embodiment of a method of driving a display device according to the disclosure, a display panel including a plurality of pixels is driven for a plurality of frames. At least one frame among the plurality of frames includes a writing frame and at least one holding frame, and a number of the at least one holding frame included in the at least one frame is adjusted depending on a driving frequency of the display panel.

The method of driving the display device includes applying a scan signal having an activation level to the plurality of pixels within a non-emission period of the writing frame, applying an emission control signal having an activation level to the plurality of pixels within an emission period of the writing frame, deactivating the scan signal in the holding frame and applying the emission control signal to the plurality of pixels within an emission period of the holding frame, measuring emission current at the driving frequency with respect to selected sample pixels among the plurality of pixels, modulating image data by a deviation between a measured emission current and a target current preset in response to the driving frequency, and generating a data signal based on modulated image data, and applying the data signal to a corresponding pixel among the plurality of pixels within the non-emission period of the writing frame.

BRIEF DESCRIPTION OF THE DRAWINGS

The above and other embodiments, advantages and features of the disclosure will become apparent by describing in detail embodiments thereof with reference to the accompanying drawings.

DETAILED DESCRIPTION

Figure 1:
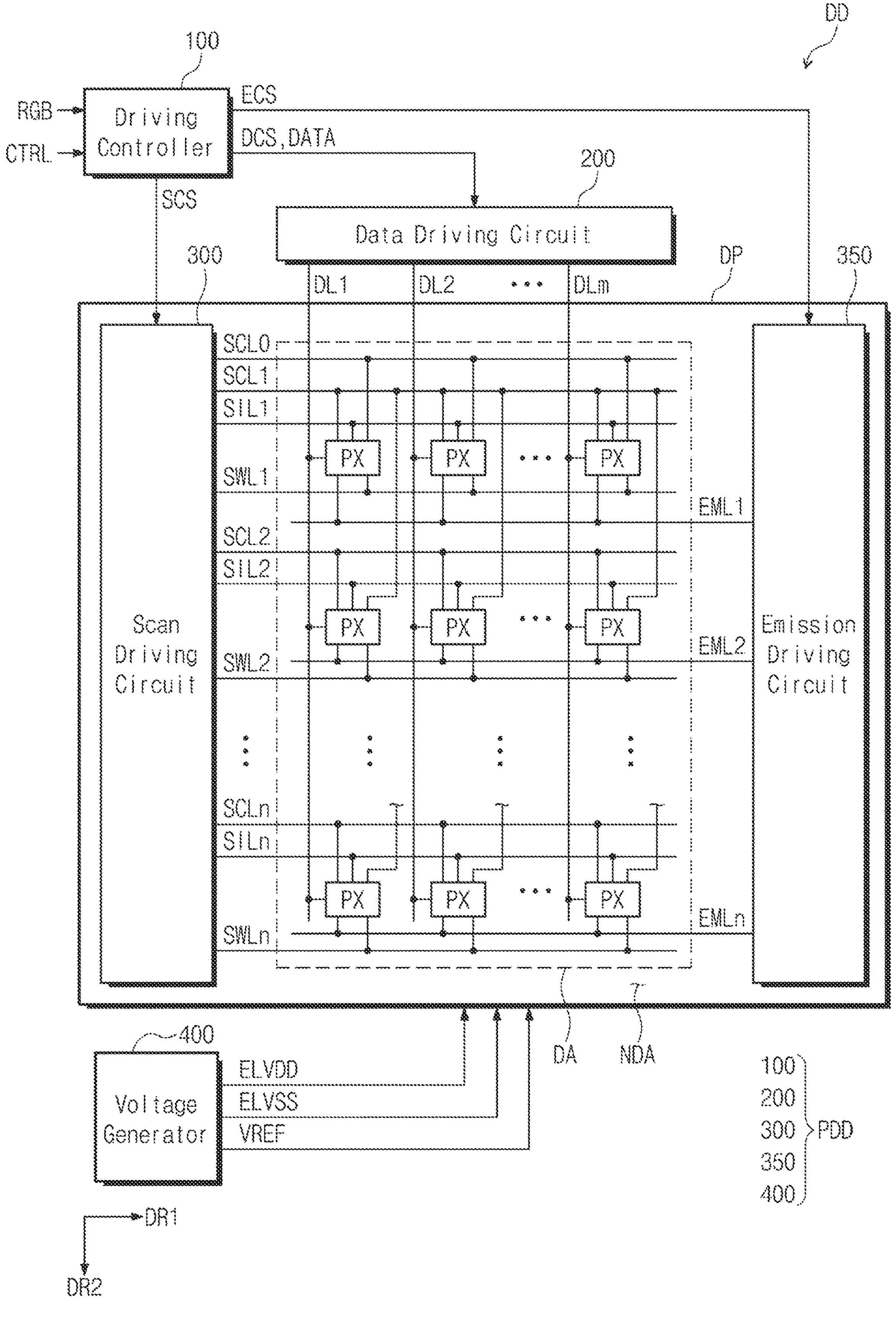
FIG. 1 is a block diagram illustrating an embodiment of a display device according to the disclosure.

In the specification, when one component (or area, layer, part, or the like) is referred to as being "on", "connected to", or "coupled to" another component, it should be understood that the former may be directly on, connected to, or coupled to the latter, and also may be on, connected to, or coupled to the latter via a third intervening component.

Like reference numerals refer to like components. Also, in drawings, the thickness, ratio, and dimension of components are exaggerated for effectiveness of description of technical contents. The term "and/or" includes one or more combinations of the associated listed items.

The terms "first", "second", etc. are used to describe various components, but the components are not limited by the terms. The terms are used only to differentiate one component from another component. A first component may be named as a second component, and vice versa, without departing from the spirit or scope of the disclosure, for example. A singular form, unless otherwise stated, includes a plural form.

Also, the terms "under", "beneath", "on", "above" are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless defined otherwise, all terms (including technical and scientific terms) used herein have the same meaning as commonly understood by one of ordinary skill in the art to which this disclosure belongs. In addition, terms such as terms defined in commonly used dictionaries should be interpreted as having a meaning consistent with the meaning in the context of the related technology, and should not be interpreted as an ideal or excessively formal meaning unless explicitly defined in the disclosure.

Hereinafter, embodiments of the disclosure will be described with reference to accompanying drawings.

FIG. 1 is a block diagram illustrating an embodiment of a display device according to the disclosure.

Referring to FIG. 1, a display device DD may be a device that is activated according to an electrical signal to display an image. The display device DD may be applied to electronic devices such as a smart watch, a tablet, a notebook computer, a computer, and a smart television.

The display device DD includes a display panel DP and a panel driver PDD driving the display panel DP. In an embodiment of the disclosure, the panel driver PDD may include a driving controller 100, a data driving circuit 200, a scan driving circuit 300, an emission driving circuit 350, and a voltage generator 400.

The driving controller 100 receives an image signal RGB and a control signal CTRL. The driving controller 100 generates image data DATA obtained by converting a data format of the image signal RGB to meet a specification of an interface with the data driving circuit 200. The driving controller 100 outputs a scan control signal SCS, a data control signal DCS, and an emission driving control signal ECS.

The data driving circuit 200 receives the data control signal DCS and the image data DATA from the driving controller 100. The data driving circuit 200 converts the image data DATA into data signals, and outputs the data signals to a plurality of data lines DL1 to DLm (m is a natural number), which will be described later. The data signals are analog voltages corresponding to grayscale values of the image data DATA.

The voltage generator 400 generates voltages desired for an operation of the display panel DP. In an embodiment of the disclosure, the voltage generator 400 generates a first driving voltage ELVDD, a second driving voltage ELVSS, and a reference voltage VREF. The reference voltage VREF may have a lower voltage level than that of the first driving voltage ELVDD.

The display panel DP includes initialization scan lines SIL1 to SILn (n is a natural number), compensation scan lines SCL0 to SCLn, write scan lines SWL1 to SWLn, emission control lines EML1 to EMLn, the data lines DL1 to DLm, and pixels PX. A display area DA and a non-display area NDA are defined in the display panel DP. In the display area DA, the initialization scan lines SIL1 to SILn, the compensation scan lines SCL0 to SCLn, the write scan lines SWL1 to SWLn, the emission control lines EML1 to EMLn, the data lines DL1 to DLm, and the pixels PX may be disposed. The initialization scan lines SIL1 to SILn, the compensation scan lines SCL0 to SCLn, the write scan lines SWL1 to SWLn, and the emission control lines EML1 to EMLn extend in a first direction DR1 and are arranged to be spaced apart from one another in a second direction DR2. The data lines DL1 to DLm extend in the first direction DR2 and are arranged to be spaced apart from one another in the first direction DR1.

The scan driving circuit 300 and the emission driving circuit 350 may be disposed in the non-display area NDA of the display panel DP. In an embodiment of the disclosure, the scan driving circuit 300 is disposed adjacent to one side of the display area DA, and the emission driving circuit 350 is disposed adjacent to an opposite side of the display area DA opposite to the one side of the display area DA. In an example illustrated in FIG. 1, the scan driving circuit 300 and the emission driving circuit 350 are respectively disposed on opposite sides of the display area DA, but the disclosure is not limited thereto. In an embodiment, the scan driving circuit 300 and the emission driving circuit 350 may be disposed adjacent to one of the one side and the opposite side of the display panel DP, for example. In an embodiment, the scan driving circuit 300 and the emission driving circuit 350 may be integrated into one circuit.

The plurality of pixels PX is electrically connected to the initialization scan lines SIL1 to SILn, the compensation scan lines SCL0 to SCLn, the write scan lines SWL1 to SWLn, the emission control lines EML1 to EMLn, and the data lines DL1 to DLm, respectively. Each of the plurality of pixels PX may be electrically connected to four scan lines and one emission control line. In an embodiment, as illustrated in FIG. 1, the pixels of a first row may be connected to the dummy compensation scan line SCL0, the first initialization scan line SILL the first compensation scan line SCL1, the first write scan line SWL1, and the first emission control line EML1, for example. In an embodiment, the pixels of a second row may be connected to the second initialization scan line SIL2, the first and second compensation scan lines SCL1 and SCL2, the second write scan line SWL2, and the second emission control line EML2, for example. However, the number of scan lines connected to each pixel PX and the number of emission control lines are not limited thereto, and may vary.

Each of the plurality of pixels PX includes a light-emitting element ED (refer to FIG. 2) and a pixel circuit unit PXC (refer to FIG. 2) for controlling light emission of the light-emitting element ED. The pixel circuit unit PXC may include one or more transistors and one or more capacitors. The scan driving circuit 300 and the emission driving circuit 350 may be directly formed in the non-display area NDA of the display panel DP through the same process as the transistors of the pixel circuit unit PXC.

Each of the plurality of pixels PX receives the first driving voltage ELVDD, the second driving voltage ELVSS, and the reference voltage VREF, from the voltage generator 400.

The scan driving circuit 300 receives the scan control signal SCS from the driving controller 100. The scan driving circuit 300 may output initialization scan signals to the initialization scan lines SIL1 to SILn, compensation scan signals to the compensation scan lines SCL0 to SCLn, and write scan signals to the write scan lines SWL1 to SWLn, in response to the scan control signal SCS. The emission driving circuit 350 may output emission control signals to the emission control lines EML1 to EMLn in response to the emission driving control signal ECS provided from driving controller 100.

The driving controller 100 in an embodiment of the disclosure may determine a driving frequency and may control operations of the data driving circuit 200, the scan driving circuit 300, and the emission driving circuit 350 depending on the determined driving frequency. In an embodiment of the disclosure, the emission driving circuit 350 may operate at a frequency higher than or equal to that of the scan driving circuit 300.

Figure 2:
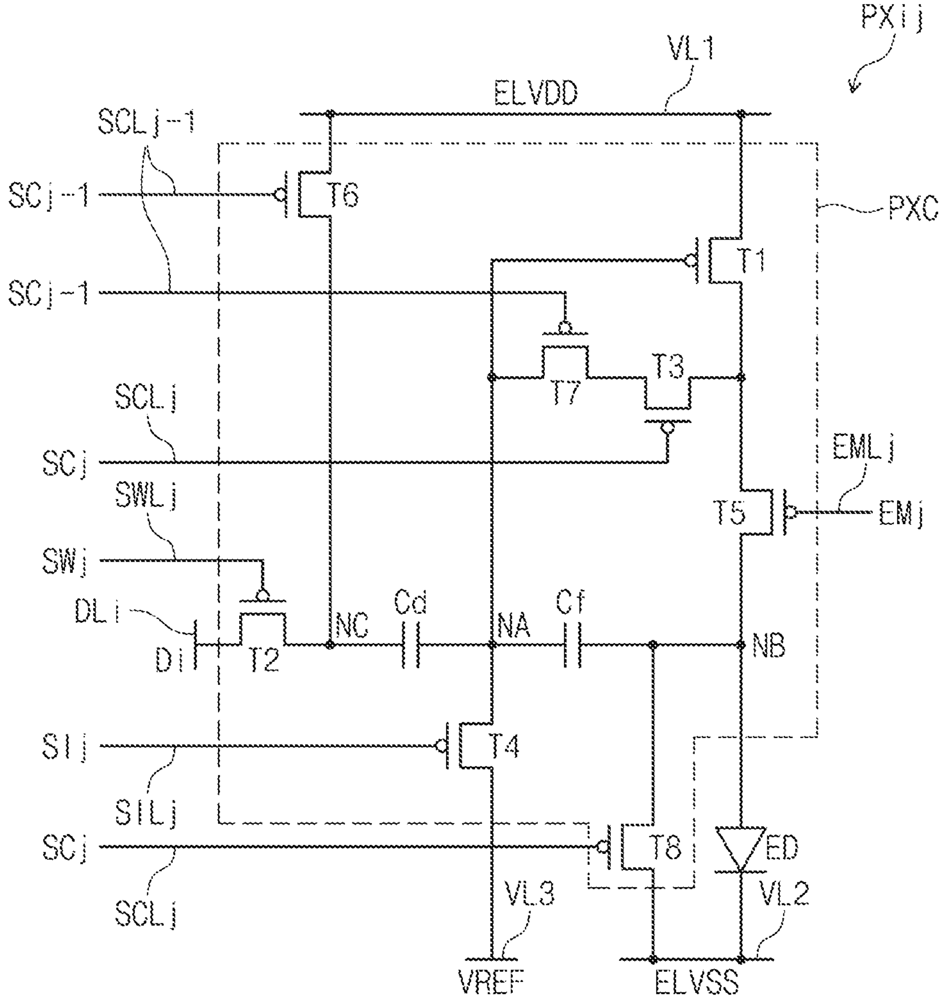
FIG. 2 is a circuit diagram of an embodiment of a pixel, according to the disclosure.

FIG. 2 is a circuit diagram of an embodiment of a pixel, according to the disclosure.

FIG. 2 illustrates an equivalent circuit diagram of one pixel PXij among the plurality of pixels PX illustrated in FIG. 1. Since each of the plurality of pixels PX illustrated in FIG. 1 has the same circuit configuration as the pixel PXij illustrated in FIG. 2, additional descriptions with respect to the remaining pixels will be omitted to avoid redundancy.

Referring to FIG. 2, the pixel PXij in an embodiment is connected to an i-th data line DLi among the data lines DL1 to DLm, a j-th initialization scan line SILj among the initialization scan lines SIL1 to SILn, a (j−1)-th compensation scan line SCLj-1 and the j-th compensation scan line SCLj among the compensation scan lines SCL1 to SCLn, a j-th write scan line SWLj among the write scan lines SWL1 to SWLn, and a j-th emission control line EMLj among the emission control lines EML1 to EMLn.

The pixel PXij includes the pixel circuit unit PXC and the light-emitting element ED. In an embodiment of the disclosure, the pixel circuit unit PXC may include eight transistors and two capacitors. However, the disclosure is not limited thereto, and the number of the transistors may be greater than or less than eight and the number of the capacitors may be greater than or less than two in other embodiments. Hereinafter, the eight transistors are also referred to as first to eighth transistors T1, T2, T3, T4, T5, T6, T7, and T8, respectively, and the two capacitors are also referred to as the first and second capacitors Cf and Cd.

In an embodiment, each of the first to eighth transistors T1 to T8 is a P-type transistor including a low-temperature polycrystalline silicon ("LTPS") semiconductor layer. In an alternative embodiment, each of the first to eighth transistors T1 to T8 may be an N-type transistor. In addition, at least one of the first to eighth transistors T1 to T8 may be the N-type transistor, and the others may be the P-type transistor. In an alternative embodiment, at least one of the first to eighth transistors T1 to T8 may be a transistor including an oxide semiconductor layer. In an embodiment, some of the first to eighth transistors T1 to T8 may be oxide semiconductor transistors, and the rest may be LTPS transistors, for example.

The circuit configuration of the pixel PXij according to the disclosure is not limited to the circuit configuration illustrated in FIG. 2. The pixel PXij illustrated in FIG. 2 is only an example. In an embodiment, the circuit configuration of the pixel PXij may be modified and implemented, for example.

The j-th initialization scan line SILj supplies a j-th initialization scan signal SIj to the pixel PXij, and the (j−1)-th and j-th compensation scan lines SCLj-1 and SCLj supplies (j−1)-th and j-th compensation scan signals SCj-1 and SCj to the pixel PXij, respectively. The j-th write scan line SWLj supplies a j-th write scan signal SWj to the pixel PXij, and the j-th emission control line EMLj supplies a j-th emission control signal EMj to the pixel PXij. The i-th data line DLi transfers an i-th data signal Di to the pixel PXij. The data signal Di may have a voltage level corresponding to the image signal RGB input to the display device DD (refer to FIG. 1).

The pixel PXij may be connected to a first voltage line VL1, a second voltage line VL2, and a reference voltage line VL3. The first voltage line VL1 transfers the first driving voltage ELVDD supplied from the voltage generator 400 illustrated in FIG. 1 to the pixel PXij, and the second voltage line VL2 transfers the second driving voltage ELVSS supplied from the voltage generator 400 to the pixel PXij. The reference voltage line VL3 may transfer the reference voltage VREF supplied from the voltage generator 400 to the pixel PXij.

The first transistor T1 is connected between the first voltage line VL1 receiving the first driving voltage ELVDD and the light-emitting element ED, and may operate depending on the potential of a first node NA. The first transistor T1 includes a first electrode connected to the first voltage line VL1, a second electrode connected to an anode of the light-emitting element ED through the fifth transistor T5, and a gate electrode connected to the first node NA. The first transistor T1 operates in response to the potential of the first node NA, and in a period in which the first and fifth transistors T1 and T5 are turned on, the first voltage line VL1 and the anode of the light-emitting element ED may be electrically connected to each other.

The second transistor T2 is connected between a third node NC and the i-th data line DLi, and receives the first scan signal (i.e., the j-th write scan signal SWj). The second transistor T2 includes a first electrode connected to the i-th data line DLi, a second electrode connected to the third node NC, and a gate electrode receiving the first scan signal. In an embodiment of the disclosure, the second transistor T2 may be connected to the j-th write scan line SWLj to receive the j-th write scan signal SWj as the first scan signal. The second transistor T2 is turned on in response to the first scan signal, and outputs the data signal Di supplied through the i-th data line DLi to the third node NC. In an embodiment of the disclosure, the data signal Di may be a data voltage including grayscale information.

The first capacitor Cf is connected between the first node NA and a second node NB. That is, a first electrode of the first capacitor Cf is connected to the first node NA, and a second electrode of the first capacitor Cf is connected to the second node NB. The second node NB may be a node in which the fifth transistor T5 and the anode of the light-emitting element ED are connected. The second capacitor Cd is connected between the first node NA and the third node NC. That is, a first electrode of the second capacitor Cd is connected to the third node NC, and a second electrode of the second capacitor Cd is connected to the first node NA.

The third transistor T3 is connected between the first node NA and the first transistor T1 and receives the second scan signal (i.e., the j-th compensation scan signal SCj). The third transistor T3 includes a first electrode connected to the second electrode of the first transistor T1, a second electrode connected to the first node NA through the seventh transistor T7, and a gate electrode receiving the second scan signal. In an embodiment of the disclosure, the third transistor T3 may be connected to the j-th compensation scan line SCLj to receive the j-th compensation scan signal SCj as the second scan signal. The third transistor T3 is turned on in response to the j-th compensation scan signal SCj. In a period in which the third and seventh transistors T3 and T7 are turned on, the first node NA may be electrically connected to the second electrode of the first transistor T1. That is, the first transistor T1 may be diode-connected by the turned-on third and seventh transistors T3 and T7.

The fourth transistor T4 is connected between the reference voltage line VL3 receiving the reference voltage VREF and the first node NA, and receives the third scan signal. The fourth transistor T4 includes a first electrode connected to the reference voltage line VL3, a second electrode connected to the first node NA, and a gate electrode for receiving the third scan signal. In an embodiment of the disclosure, the fourth transistor T4 may be connected to the j-th initialization scan line SILj to receive a j-th initialization scan signal SIj as the third scan signal. The fourth transistor T4 electrically connects the first node NA and the reference voltage line VL3 in response to the j-th initialization scan signal SIj.

The fifth transistor T5 is connected between the first transistor T1 and the second node NB and receives the emission control signal. The fifth transistor T5 includes a first electrode connected to the second electrode of the first transistor T1, a second electrode connected to the second node NB, and a gate electrode receiving the emission control signal. In an embodiment of the disclosure, the fifth transistor T5 may be connected to the j-th emission control line EMLj to receive the j-th emission control signal EMj as the emission control signal. The fifth transistor T5 electrically connects the first transistor T1 and the light-emitting element ED in response to the j-th emission control signal EMj.

The sixth transistor T6 is connected between the first voltage line VL1 and the third node NC and receives the fourth scan signal. The sixth transistor T6 includes a first electrode connected to the first voltage line VL1, a second electrode connected to the third node NC, and a gate electrode receiving the fourth scan signal. The sixth transistor T6 may be connected to the (j−1)-th compensation scan line SCLj-1 to receive the (j−1)-th compensation scan signal SCj-1 as the fourth scan signal. The sixth transistor T6 electrically connects the third node NC and the first voltage line VL1 in response to the (j−1)-th compensation scan signal SCj-1.

The seventh transistor T7 is connected between the first node NA and the third transistor T3 and receives the fifth scan signal. The seventh transistor T7 includes a first electrode connected to the second electrode of the third transistor T3, a second electrode connected to the first node NA, and a gate electrode receiving the fifth scan signal. In an embodiment of the disclosure, the seventh transistor T7 may be connected to the (j−1)-th compensation scan line SCLj-1 to receive the (j−1)-th compensation scan signal SCj-1 as the fifth scan signal. The seventh transistor T7 may be turned on in response to the (j−1)-th compensation scan signal SCj-1. The first transistor T1 may be diode-connected during a period in which the third and seventh transistors T3 and T7 are simultaneously turned on.

The light-emitting element ED is connected between the second voltage line VL2 receiving the second driving voltage ELVSS and the second node NB. The anode of the light-emitting element ED is connected to the second node NB, and the cathode of the light-emitting element ED is connected to the second voltage line VL2.

The eighth transistor T8 is connected between the second node NB and the second voltage line VL2 and may receive the sixth scan signal. The eighth transistor T8 includes a first electrode connected to the second voltage line VL2, a second electrode connected to the second node NB, and a gate electrode receiving the sixth scan signal. In an embodiment of the disclosure, the eighth transistor T8 may be connected to the j-th compensation scan line SCLj to receive the j-th compensation scan signal SCj as the sixth scan signal. The eighth transistor T8 may apply the second driving voltage ELVSS to the second node NB in response to the j-th compensation scan signal SCj.

Figure 3A:
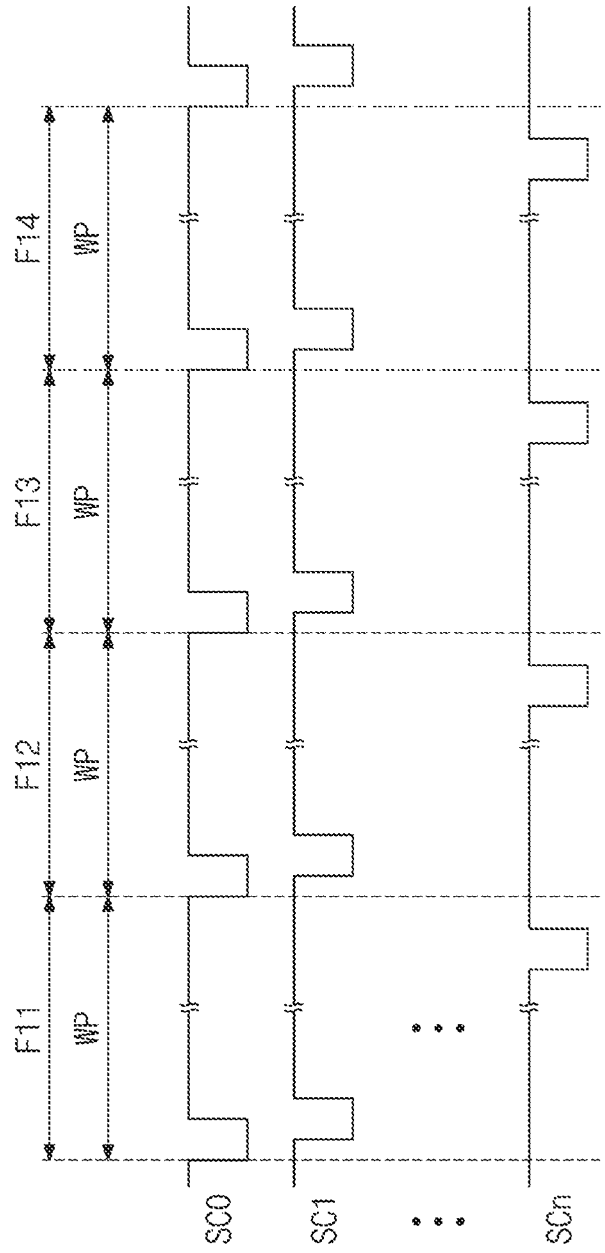
FIGS. 3A, 3B, and 3C are timing diagrams for describing an embodiment of an operation of a display device, according to the disclosure.
Figure 3B:
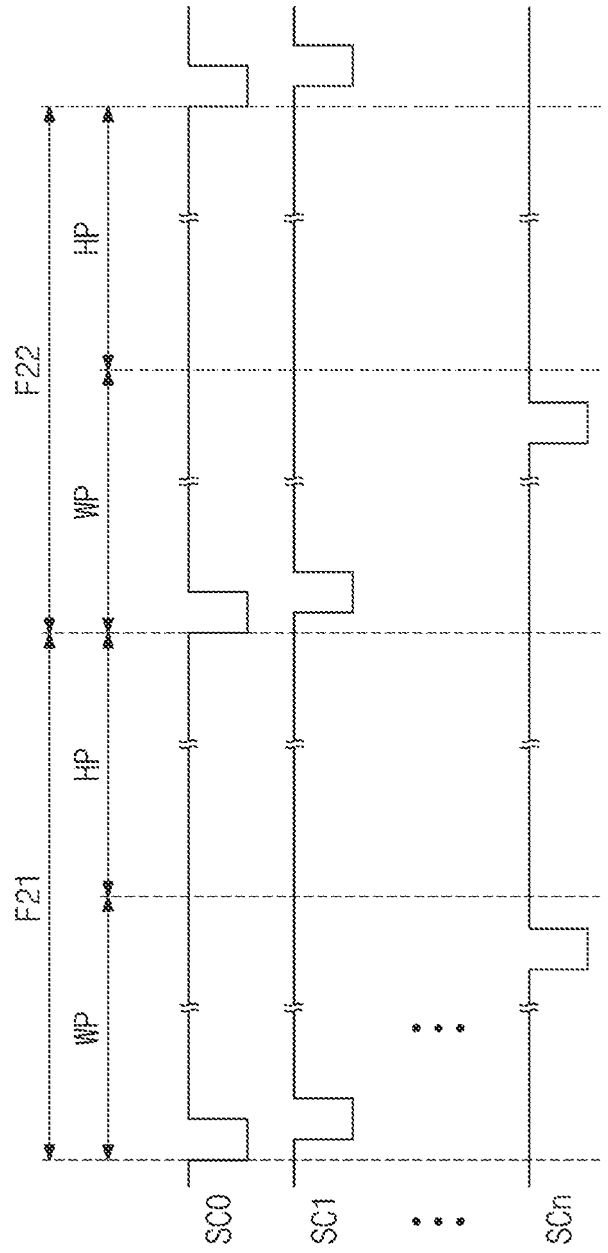
Figure 3C:
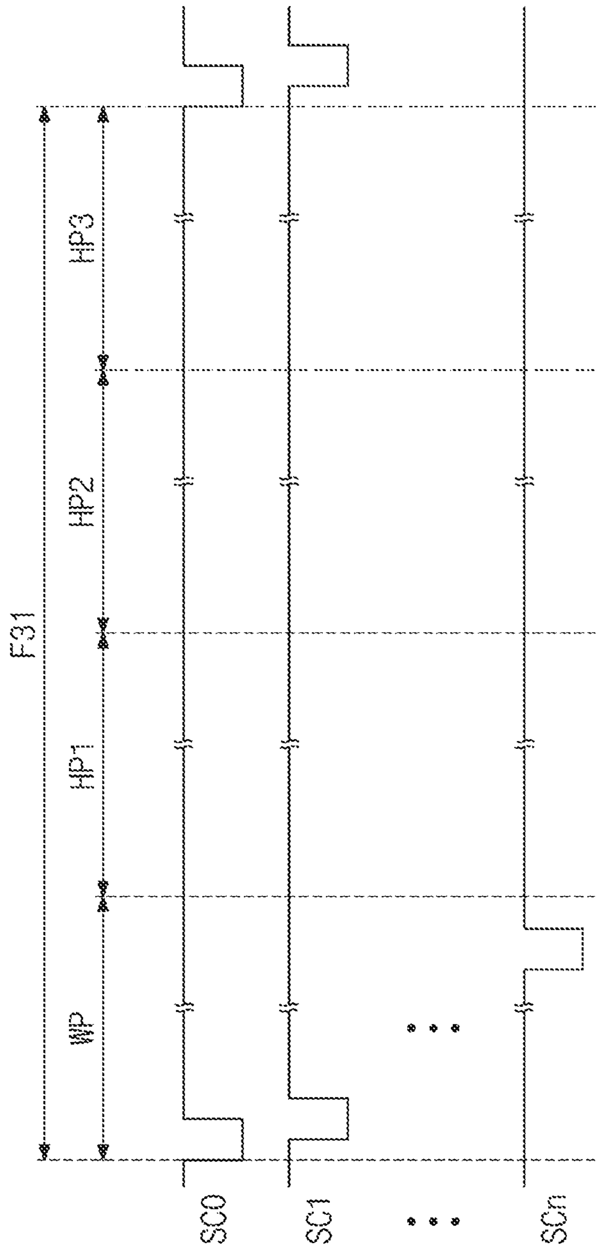

FIG. 3A is a timing diagram for describing a case in which a display device in an embodiment of the disclosure operates at a first driving frequency. FIG. 3B is a timing diagram for describing a case in which a display device in an embodiment of the disclosure operates at a second driving frequency. FIG. 3C is a timing diagram for describing a case in which a display device in an embodiment of the disclosure operates at a third driving frequency.

Referring to FIGS. 1 to 3A, a driving frequency of the display device DD may be variously changed. In an embodiment of the disclosure, the first driving frequency may be the highest driving frequency at which the display device DD may operate. In an embodiment, the first driving frequency may be 240 Hz. The first driving frequency may be also referred to as a reference frequency or a maximum frequency.

When the display device DD operates at the first driving frequency, the scan driving circuit 300 may sequentially activate the scan signals (e.g., compensation scan signals SC0 to SCn) to a low level in each of a plurality of frames F11, F12, F13, and F14. Although only the compensation scan signals SC0 to SCn are illustrated in FIGS. 3A to 3C for convenience of description, initialization scan signals SI1 to SIn and write scan signals SW1 to SWn may also be activated in a similar manner depending on the driving frequency.

When the first driving frequency is the maximum frequency, each of the frames F11, F12, F13, and F14 may include only a writing frame WP. In this case, the duration of the writing frame WP may be the same as the duration of each of the frames F11, F12, F13, and F14.

Referring to FIGS. 1 to 3B, the display device DD may operate at a second driving frequency lower than the first driving frequency. In an embodiment of the disclosure, it is described that the second driving frequency is 120 Hz in an embodiment, but the second driving frequency is not limited thereto. The driving frequency of the display device DD may be variously changed. In an embodiment, the driving frequency of the display device DD may be determined according to a characteristic (e.g., a moving image or a still image) of the image signal RGB.

When the display device DD operates at the second driving frequency lower than the first driving frequency, the duration of each of frames F21 and F22 may be longer than the duration of each of the frames F11, F12, F13, and F14 illustrated in FIG. 3A. In an embodiment of the disclosure, the duration of each of the frames F21 and F22 may be twice the duration of each of the frames F11, F12, F13, and F14. Each of the frames F21 and F22 may include a writing frame WP and a holding frame HP. The writing frame WP may have the same duration as each of the frames F11, F12, F13, and F14 illustrated in FIG. 3A.

The scan driving circuit 300 may sequentially activate the compensation scan signals SC0 to SCn to an activation level (e.g., a low level) during the writing frame WP. Although not illustrated in FIG. 3B, the emission driving circuit 350 may sequentially activate the emission control signals to an activation level (e.g., a low level) during the writing frame WP.

The scan driving circuit 300 maintains the compensation scan signals SC0 to SCn at a deactivation level (e.g., a high level) during the holding frame HP. Although not illustrated in FIG. 3B, the emission driving circuit 350 may sequentially activate the emission control signals to an activation level (e.g., a low level) during the holding frame HP. That is, even when the driving frequency of the display device DD is changed to the second driving frequency, the emission control signals may still be output at the first driving frequency.

Referring to FIGS. 1 to 3C, the display device DD may operate at a third driving frequency lower than the first and second driving frequencies. In an embodiment of the disclosure, it is described that the third driving frequency is 60 Hz, but the third driving frequency is not limited thereto.

When the display device DD operates at the third driving frequency, the duration of a frame F31 may be longer than the duration of each of the frames F11, F12, F13, and F14 illustrated in FIG. 3A. In an embodiment of the disclosure, the duration of the frame F31 may be four times the duration of each of the frames F11, F12, F13, and F14. The frame F31 may include the writing frame WP and a plurality of holding frames (e.g., first to third holding frames HP1 to HP3). The writing frame WP may have the same duration as each of the frames F11, F12, F13, and F14 illustrated in FIG. 3A.

The scan driving circuit 300 may sequentially activate the compensation scan signals SC0 to SCn to an activation level (e.g., a low level) during the writing frame WP. Although not illustrated in FIG. 3C, the emission driving circuit 350 may sequentially activate the emission control signals to an activation level (e.g., a low level) during the writing frame WP.

The scan driving circuit 300 may maintain the compensation scan signals SC0 to SCn at a deactivation level (e.g., a high level) during the first to third holding frames HP1 to HP3. Although not illustrated in FIG. 3C, the emission driving circuit 350 may sequentially activate the emission control signals to an activation level (e.g., a low level) during the first to third holding frames HP1 to HP3. That is, even when the driving frequency of the display device DD is changed to the third driving frequency, the emission control signals may still be output at the first driving frequency.

Figure 4A:
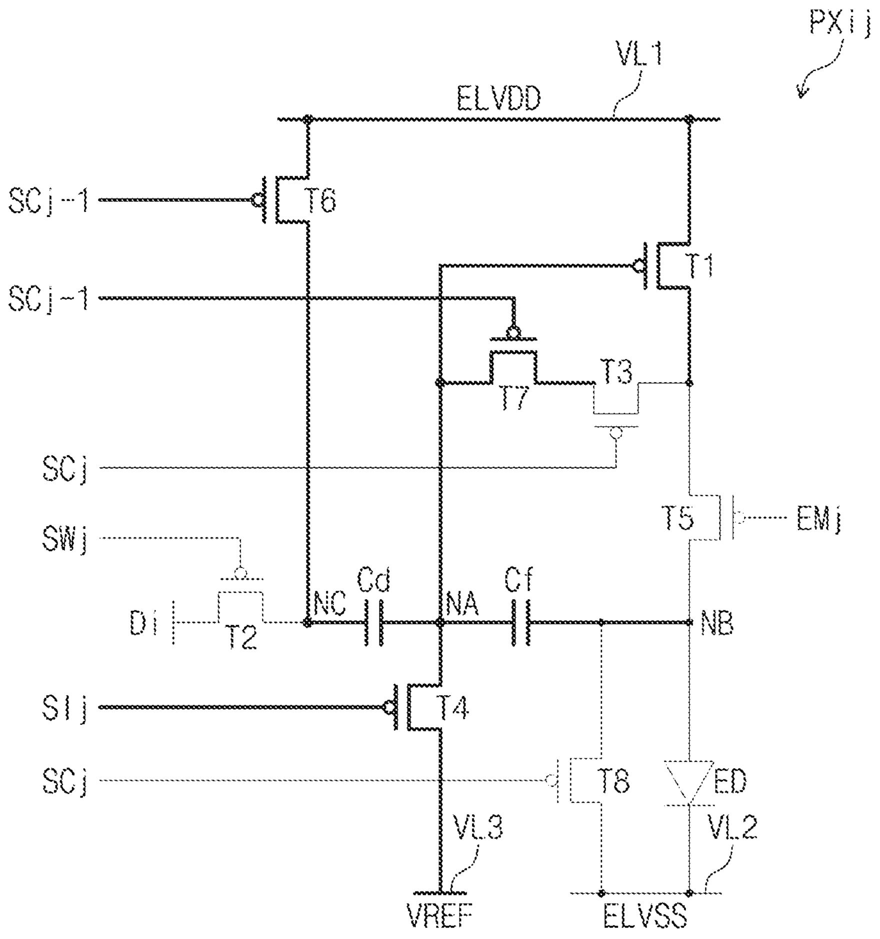
FIGS. 4A and 4B are diagrams for describing an embodiment of an operation of a pixel during a first period, according to the disclosure.
Figure 4B:
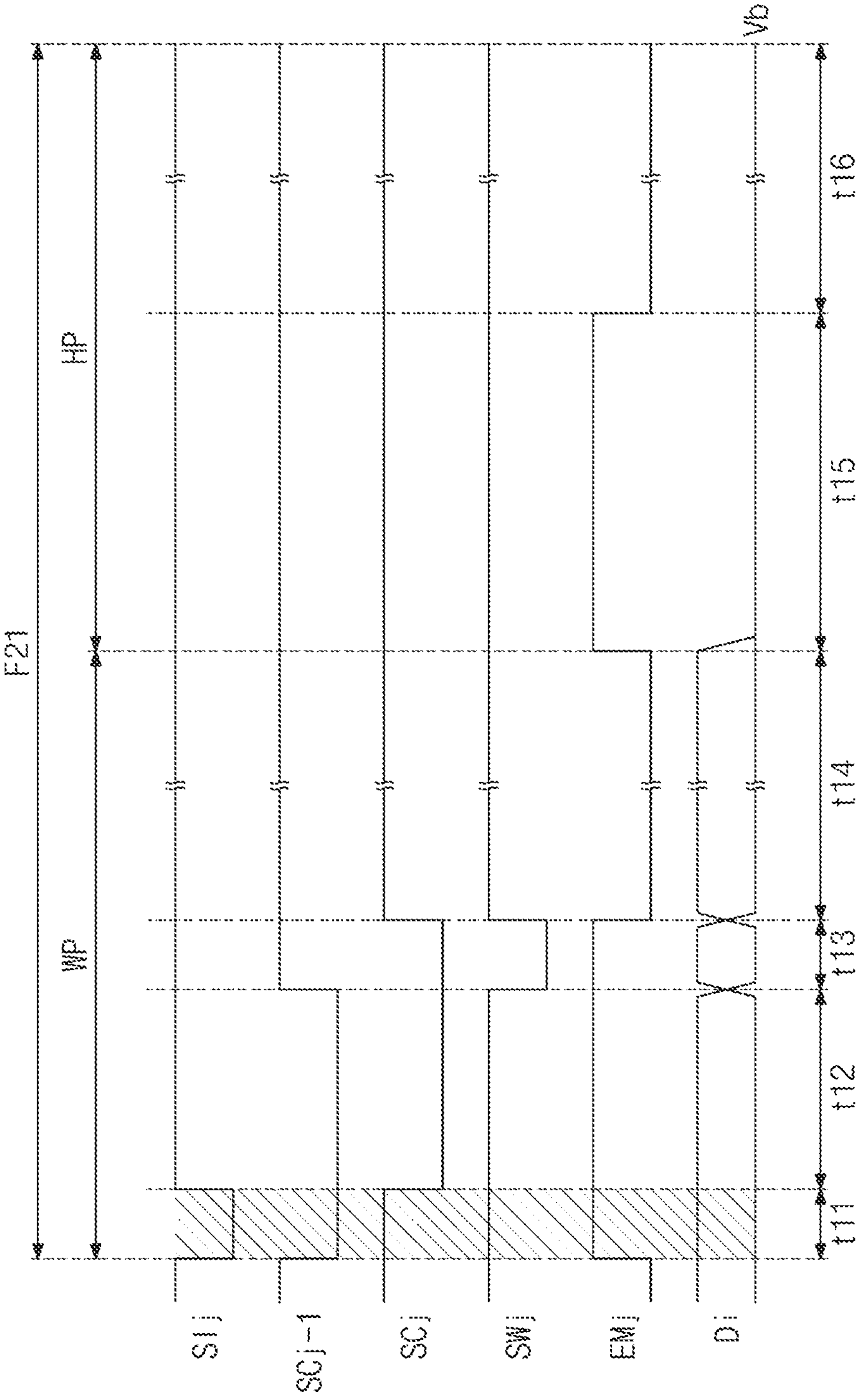
Figure 5A:
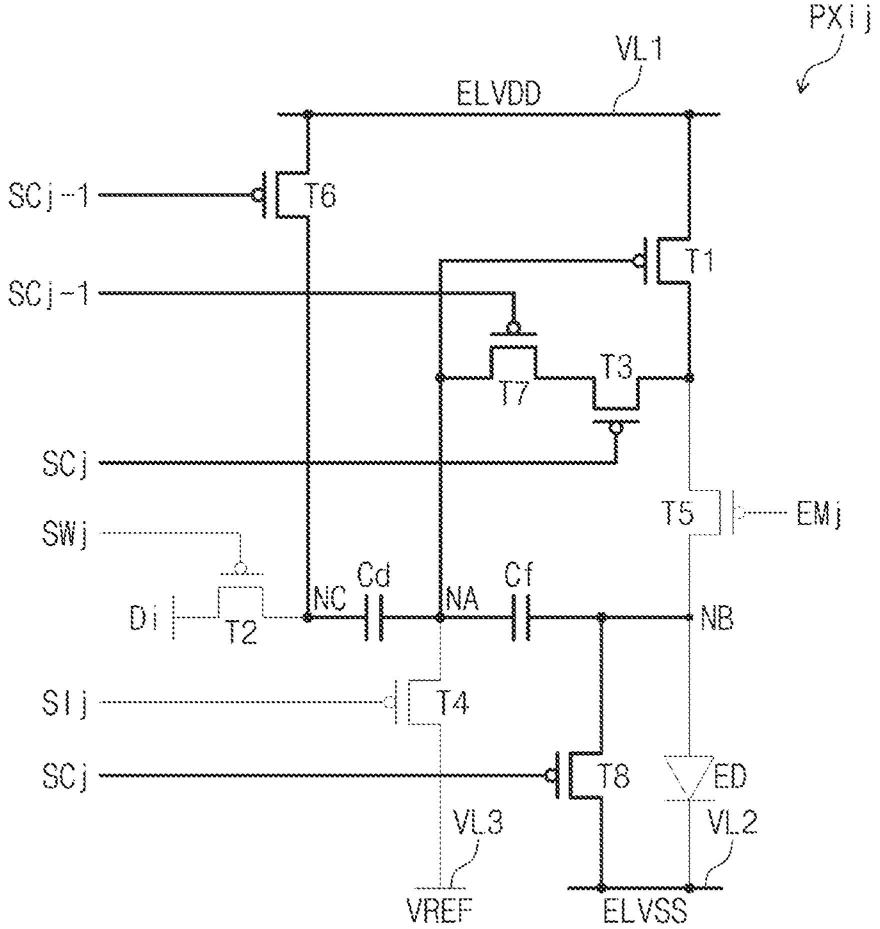
FIGS. 5A and 5B are diagrams for describing an embodiment of an operation of a pixel during a second period, according to the disclosure.
Figure 5B:
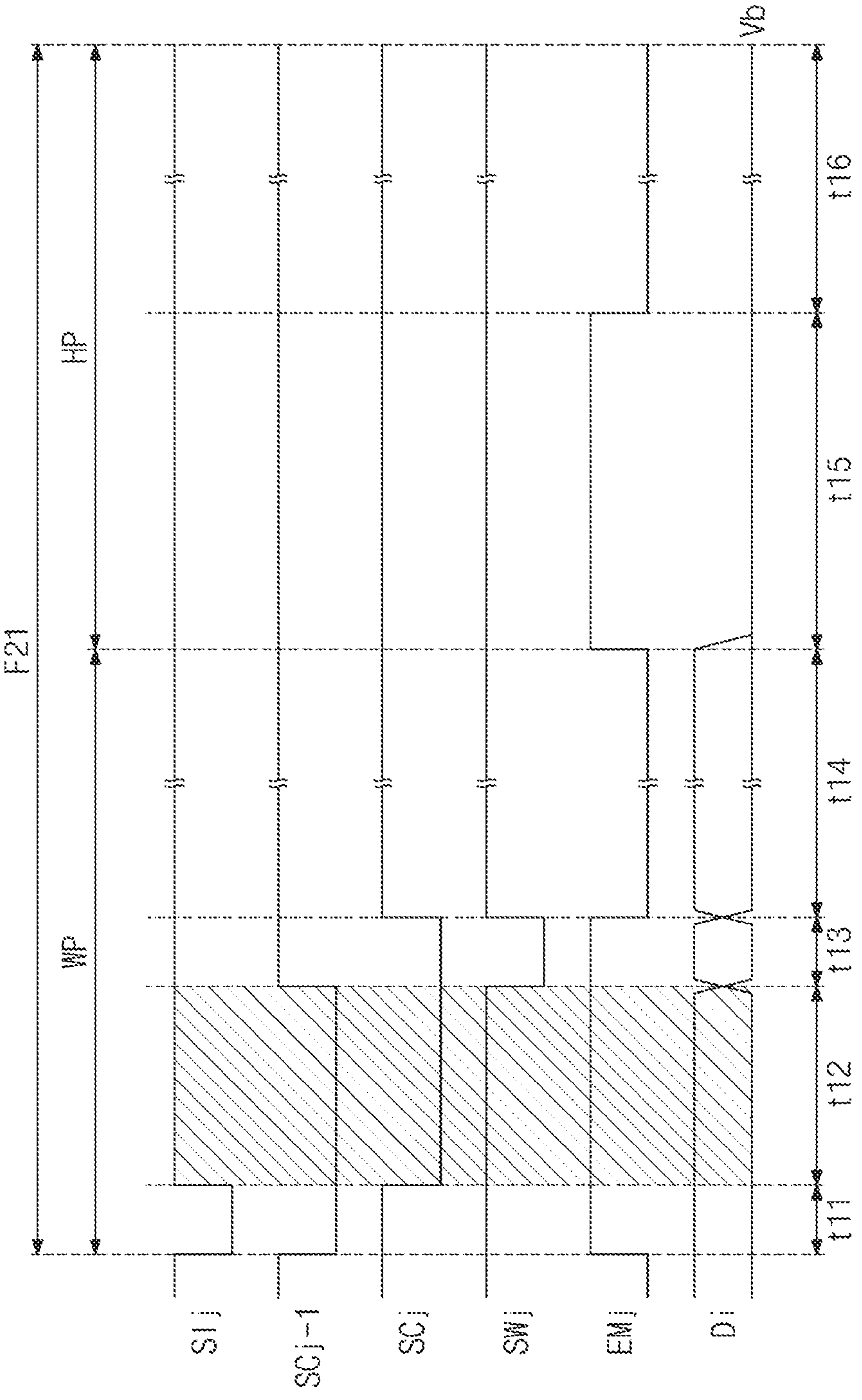
Figure 6A:
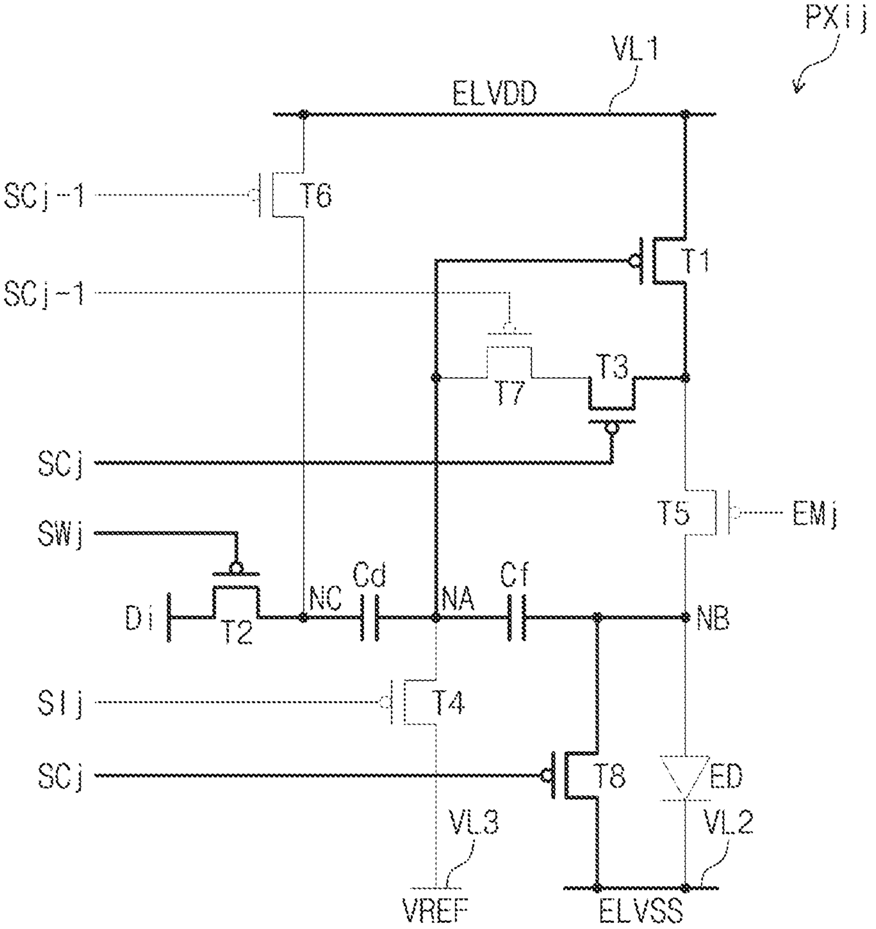
FIGS. 6A and 6B are diagrams for describing an embodiment of an operation of a pixel during a third period, according to the disclosure.
Figure 6B:
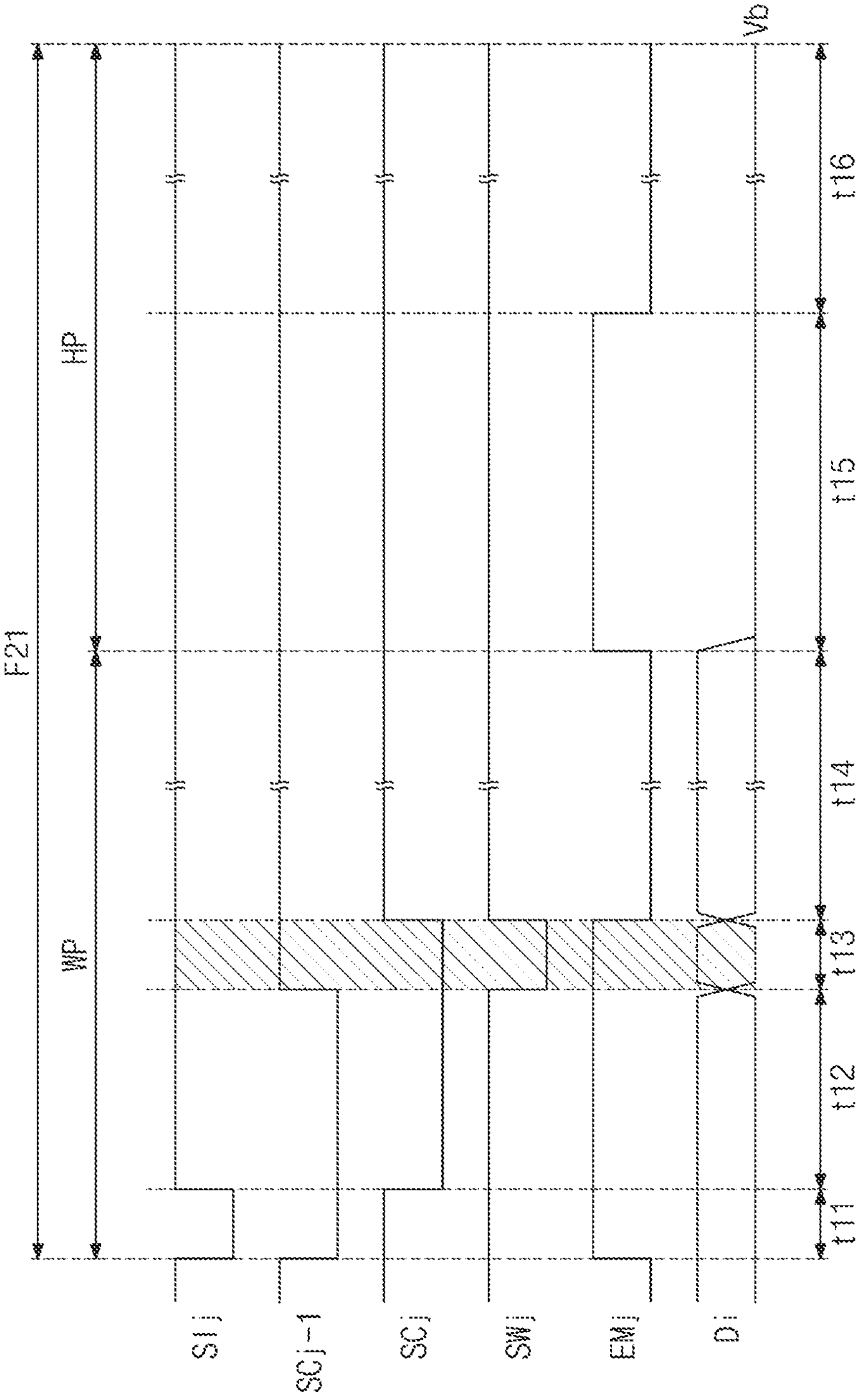
Figure 7A:
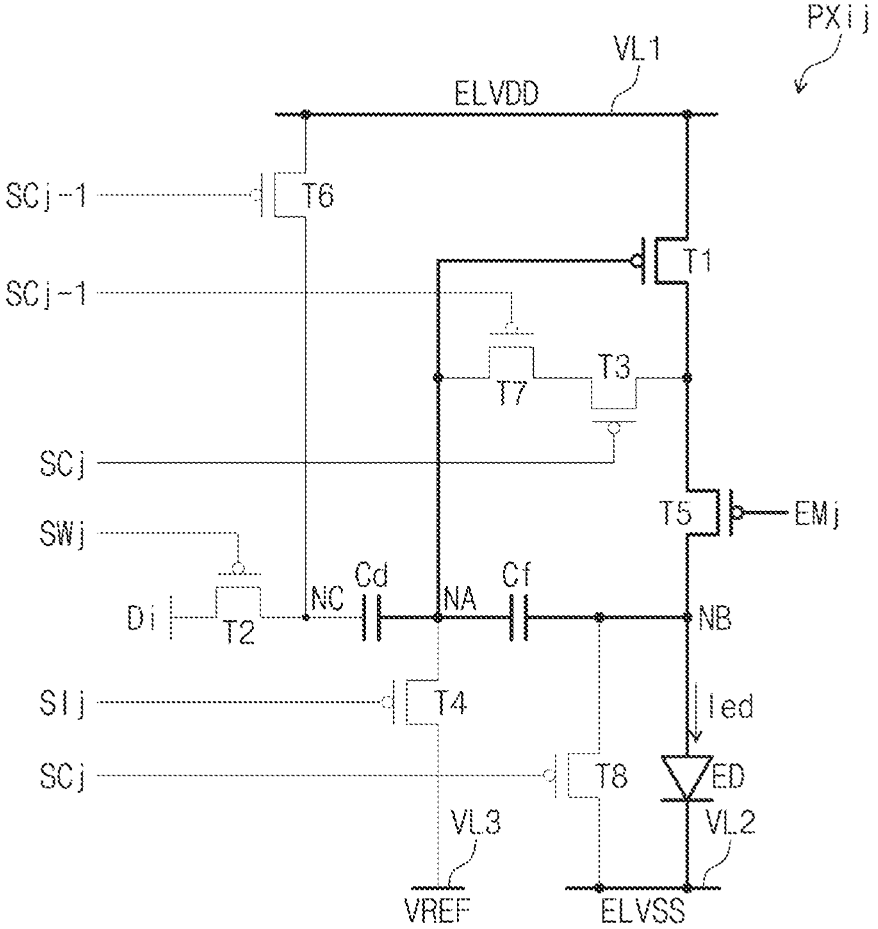
FIGS. 7A and 7B are diagrams for describing an embodiment of an operation of a pixel during a fourth period and a sixth period, according to the disclosure.
Figure 7B:
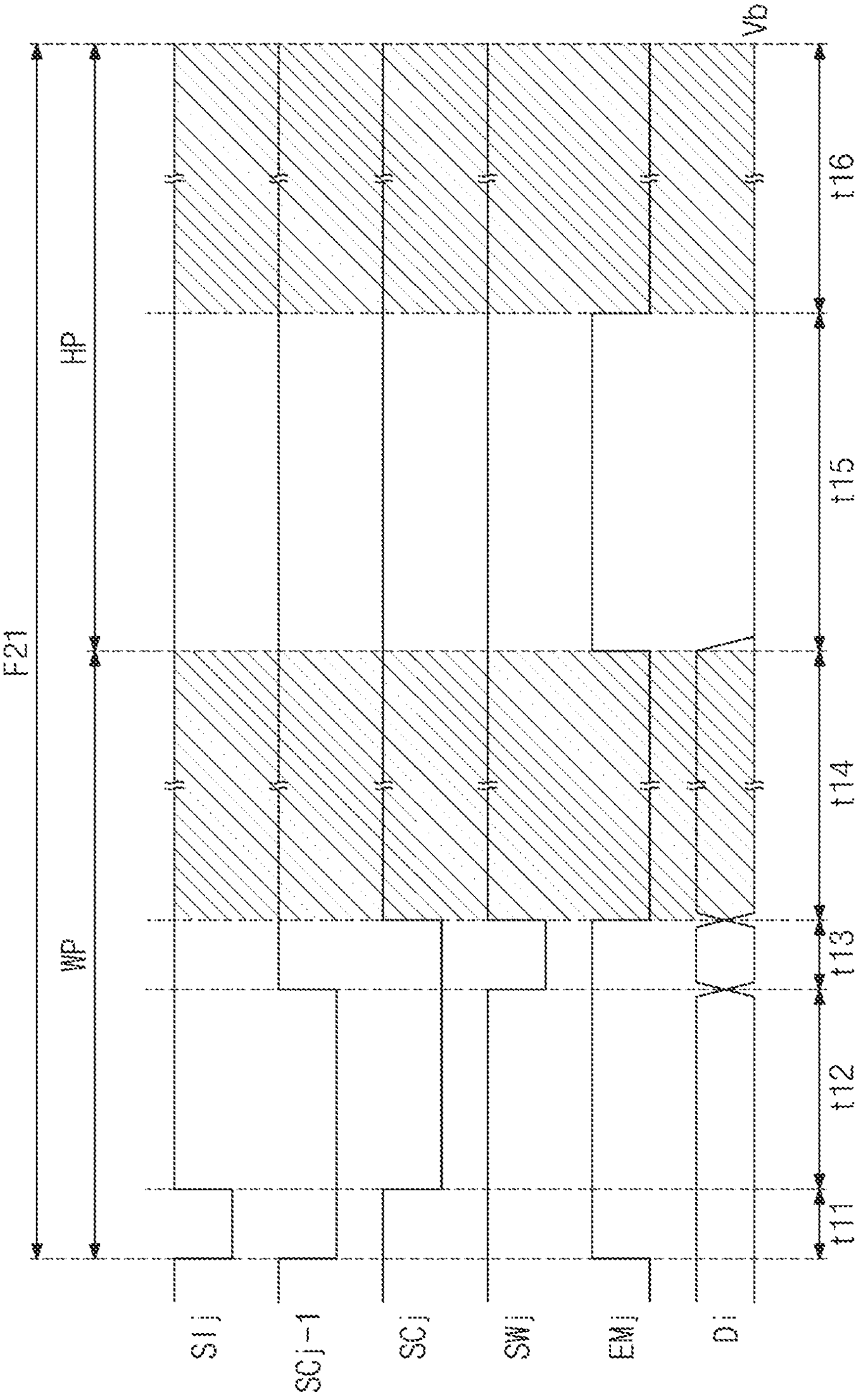
Figure 8A:
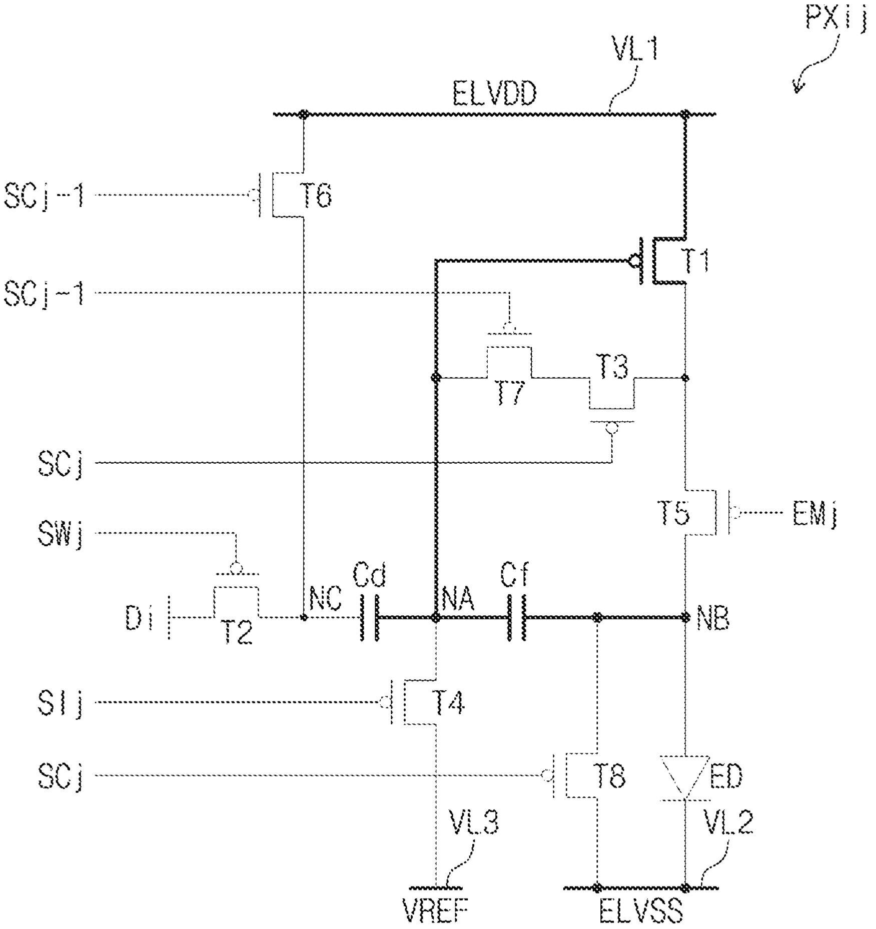
FIGS. 8A and 8B are diagrams for describing an embodiment of an operation of a pixel during a fifth period, according to the disclosure.
Figure 8B:
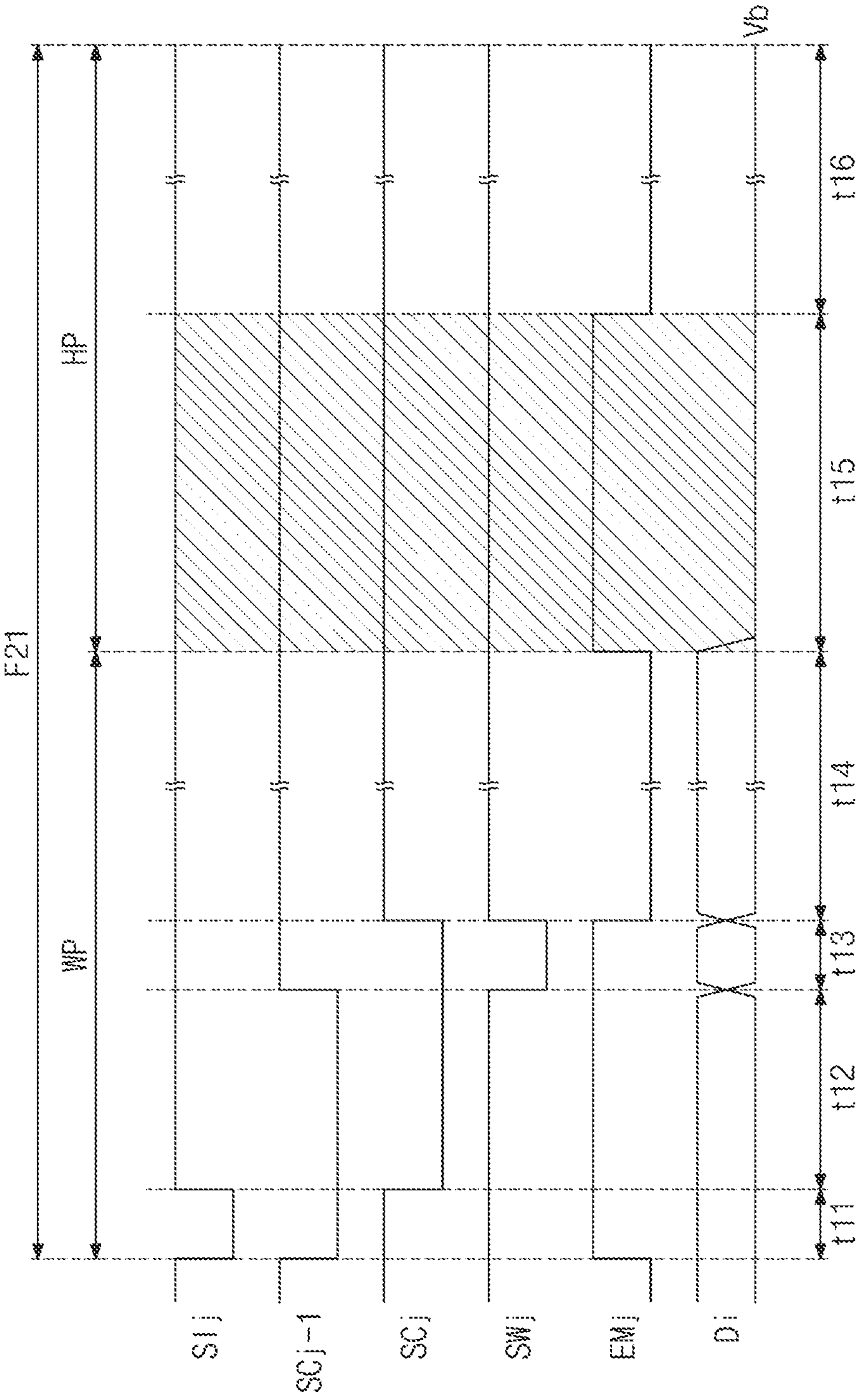

FIGS. 4A and 4B are diagrams for describing an embodiment of an operation of a pixel during a first period, according to the disclosure. FIGS. 5A and 5B are diagrams for describing an embodiment of an operation of a pixel during a second period, according to the disclosure. FIGS. 6A and 6B are diagrams for describing an embodiment of an operation of a pixel during a third period, according to the disclosure. FIGS. 7A and 7B are diagrams for describing an embodiment of an operation of a pixel during a fourth period and a sixth period, according to the disclosure, and FIGS. 8A and 8B are diagrams for describing an embodiment of an operation of a pixel during a fifth period, according to the disclosure.

FIGS. 4B, 5B, 6B, 7B, and 8B illustrate an operation of the pixel during the frame F21 illustrated in FIG. 3B, but the disclosure is not limited thereto.

In FIGS. 4B, 5B, 6B, 7B, and 8B, one frame F21 includes the writing frame WP and the holding frame HP. The writing frame WP includes first to fourth periods t11 to t14, and the holding frame HP includes fifth and sixth periods t15 and t16.

Referring to FIGS. 4A and 4B, the (j−1)-th compensation scan signal SCj-1 and the j-th initialization scan signal SIj have activation levels during the first period t11 of the writing frame WP. Accordingly, the fourth transistor T4 is turned on in response to the j-th initialization scan signal SIj (i.e., the third scan signal) during the first period tn. Accordingly, during the first period t11, the reference voltage VREF is transferred to the first node NA through the turned-on fourth transistor T4, and the potential of the first node NA may be initialized to the reference voltage VREF. That is, the first period t11 may be an initialization period in which the first node NA is initialized to the reference voltage VREF.

During the first period t11, the sixth and seventh transistors T6 and T7 are turned on in response to the (j−1)-th compensation scan signal SCj-1 (i.e., the fourth and fifth scan signals). Accordingly, during the first period t11, the first driving voltage ELVDD is transferred to the third node NC through the turned-on sixth transistor T6, and the potential of the third node NC may be initialized to the first driving voltage ELVDD.

During the first period t11 of the writing frame WP, the j-th compensation scan signal SCj, the j-th write scan signal SWj, and the j-th emission control signal EMj have deactivation levels. The (j−1)-th compensation scan signal SCj-1 (i.e., the fourth and fifth scan signals) may be activated earlier than the j-th compensation scan signal SCj (i.e., the second and sixth scan signals) by the duration of the first period t11.

Referring to FIGS. 5A and 5B, the (j−1)-th compensation scan signal SCj-1 and the j-th compensation scan signal SCj have activation levels during the second period t12 of the writing frame WP. Accordingly, the first, third, sixth, seventh, and eighth transistors T1, T3, T6, T7, and T8 may be turned on during the second period t12. Since the third and seventh transistors T3 and T7 are simultaneously turned on during the second period t12, the first transistor T1 may be connected in a diode form. Accordingly, the potential of the first node NA gradually rises from the reference voltage VREF and is changed to 'ELVDD-Vth'. Here, Vth may be a threshold voltage of the first transistor T1. The second period t12 may be a compensation period in which the potential of the first node NA is compensated by the threshold voltage Vth of the first transistor T1. The second period t12 may be a period generated subsequent to the first period t11. The duration of the second period t12 may be greater than the duration of the first period t11. The duration of the second period t12 may be twice or more than the duration of the first period t11.

During the second period t12, the eighth transistor T8 may be turned on in response to the j-th compensation scan signal SCj (i.e., the sixth scan signal). Accordingly, the second driving voltage ELVSS is applied to the second node NB through the eighth transistor T8 turned on during the second period t12, and the potential of the anode of the light-emitting element ED is also maintained at the second driving voltage ELVSS. During the second period t12, the potential of the third node NC may be maintained at the first driving voltage ELVDD by the turned-on sixth transistor T6.

Referring to FIGS. 6A and 6B, during the third period t13 of the writing frame WP, the (j−1)-th compensation scan signal SCj-1 has a deactivation level and the j-th compensation scan signal SCj has an activation level. The (j−1)-th compensation scan signal SCj-1 may be deactivated earlier than the j-th compensation scan signal SCj by the duration of the third period t13. In an embodiment, the duration of the third period t13 may be equal to the first period t11, but the disclosure is not limited thereto. During the third period t13, the sixth and seventh transistors T6 and T7 are turned off in response to the (j−1)-th compensation scan signal SCj-1, and the third and eighth transistors T3 and T8 are maintained at the turned-on state in response to the j-th compensation scan signal SCj.

Also, during the third period t13, the j-th write scan signal SWj (i.e., the first scan signal) has an activation level. Accordingly, during the third period t13, the second transistor T2 is turned on in response to the j-th write scan signal SWj, and the data signal Di may be applied to the third node NC through the turned-on second transistor T2. Accordingly, the potential of the third node NC may be changed to a voltage level Vdata corresponding to the data signal Di. The third period t13 may be a programming period in which the data signal Di is provided to the third node NC.

The third period t13 may be a period generated subsequent to the second period t12. During the third period t13 of the writing frame WP, the j-th emission control signal EMj has a deactivation level. Accordingly, during the third period t13, the fifth transistor T5 maintains a turn-off state.

During the third period t13, the second node NB is maintained at the second driving voltage ELVSS by the turned-on eighth transistor T8, so that during the third period t13, the potential VA of the first node NA may be calculated by the following Equation 1 by coupling of the first and second capacitors Cf and Cd.

$$VA = ELVDD - Vth + \frac{Cd}{Cf + Cd}(Vdata - ELVDD) \quad \text{[Equation 1]}$$

Referring to FIGS. 7A and 7B, during the fourth period t14 of the writing frame WP, the j-th compensation scan signal SCj and the j-th write scan signal SWj have deactivation levels. Accordingly, the second and eighth transistors T2 and T8 are turned off during the fourth period t14.

During the fourth period t14 of the writing frame WP, the j-th emission control signal EMj has an activation level. Accordingly, during the fourth period t14, the fifth transistor T5 is turned on in response to the j-th emission control signal EMj. As the fifth transistor T5 is turned on, an emission current led' flows to the light-emitting element ED, and accordingly, a potential VB of the second node NB rises to a voltage (i.e., the anode voltage of the light-emitting element ED) corresponding to the emission current Ied. As the potential VB of the second node NB varies, a potential VA of the first node NA may be calculated by the following Equation 2 by the coupling of the first and second capacitors Cf and Cb.

$$VA = ELVDD - Vth + \frac{Cd}{Cf + Cd}(Vdata - ELVDD) + VB \quad \text{[Equation 2]}$$

In the fourth period t14, the emission current led flowing to the light-emitting element ED through the first transistor T1 may be controlled depending on the potential VA of the first node NA. Even during the sixth period t16 of the holding frame HP, the fifth transistor T5 is turned on in response to the j-th emission control signal EMj. Accordingly, the emission current Ted flowing to the light-emitting element ED through the first and fifth transistors T1 and T5 during the sixth period t16 may be controlled depending on the potential VA of the first node NA. The light-emitting element ED may emit light depending on the emission current Ted. That is, the fourth and sixth periods t14 and t16 may be an emission period in which the light-emitting element ED emits light.

When the light-emitting element ED operates, a voltage drop of the second driving voltage ELVSS due to a line resistance of the second voltage line VL2 may be reflected in the second node NB. However, during the second and third periods t12 and t13, since the second node NB has already been maintained at the second driving voltage ELVSS to which the voltage drop is reflected, the voltage drop component of the second driving voltage ELVSS in the fourth period t14 may not affect the emission current Ted of the light-emitting element ED. Accordingly, it is possible to reduce the deviation of the emission current Ted for each pixel due to the voltage drop deviation of the second driving voltage ELVSS.

As seen from Equation 2, the emission current Ted depends on the threshold voltage Vth of the first transistor T1. The threshold voltage Vth of the first transistor T1 may vary depending on a position of the pixel PX (refer to FIG. 1), and may be shifted due to deterioration according to the driving time. In particular, since the degree of change (or deterioration) of the threshold voltage Vth of the first transistor T1 is different for each pixel, the degree of shift of the threshold voltage Vth of the first transistor T1 is also different for each pixel.

As described above with reference to FIGS. 5A and 5B, it is desired to secure a sufficiently long time for the second period t12 such that the voltage level of the first node NA sufficiently compensates for the deviation or change caused by the threshold voltage Vth of the first transistor T1. In this embodiment, the duration of the second period t12 is longer than the duration of the third period t13. In particular, since the second period t12 (i.e., the compensation period) is sufficiently secured regardless of the driving frequency, the deviation or change in the threshold voltage of the first transistor T1 is sufficiently compensated by the potential of the first node NA.

When the duration of the compensation period (i.e., the second period t12) is increased, since the threshold voltage Vth of the first transistor T1 is sensed at a relatively high gate-source voltage Vgs, when the data signal Di having the relatively high grayscale is applied, a deviation (i.e., a current deviation) may occur in the slope of the drain current curve according to the characteristics of the first transistor T1 below the threshold voltage Vth. However, when the drain current having a different magnitude according to the characteristics of the first transistor T1 is reflected to the second node NB through the turned-on fifth transistor T5 in the fourth period t14, since the first and second nodes NA and NB are coupled through the first capacitor Cf, a change in the second node NB may be reflected back to the gate electrode of the first transistor T1. That is, when the drain current decreases, the potential of the second node NB goes down, and the potential of the first node NA also goes down by coupling through the first capacitor Cf. When the potential of the first node NA goes down, the drain current of the first transistor T1 may increase. In contrast, when the drain current increases, the potential of the second node NB increases, and the potential of the first node NA also increases by coupling through the first capacitor Cf. When the potential of the first node NA increases, the drain current of the first transistor T1 may decrease. Since the drain current of the first transistor T1 is adjusted through such feedback process, it is possible to prevent a luminance deviation from occurring due to a current deviation in the relatively high grayscale region.

The potential of the first node NA may be initialized with a fixed period by the fourth transistor T4. In addition, as the feedback process is repeated even during low-frequency driving, it is possible to minimize the change in luminance according to the hysteresis characteristic of the first transistor T1, and as a result, it is possible to prevent the flicker phenomenon from appearing due to the current deviation generated in the relatively low grayscale region. That is, it is possible to reduce the current deviation in all grayscale regions through this feedback process.

Referring to FIGS. 8A and 8B, when the holding frame HP is initiated, the data signal Di may be held by a bias voltage Vb. The bias voltage Vb may be a voltage maintained at a uniform voltage level during the holding frame HP. In an embodiment of the disclosure, the bias voltage Vb may have a voltage level corresponding to a black grayscale, but is not limited thereto. During the holding frame HP, the j-th initialization scan signal SIj, the (j−1)-th and j-th compensation scan signals SCj-1 and SCj, and the j-th write scan signal SWj maintain a deactivation level. Even when the j-th emission control signal EMj partially has an activation level during the fifth period t15 of the holding frame HP, the j-th initialization scan signal SIj, the (j−1)-th and j-th compensation scan signals SCj-1 and SCj, and the j-th write scan signal SWj are maintained at a deactivation level. Accordingly, during the fifth period t15, the second to sixth and eighth transistors T2, T3, T4, T5, T6, and T8 may be in a turn-off state, and as a result, the voltage level VA of the first node NA may be maintained uniformly.

Figure 9:
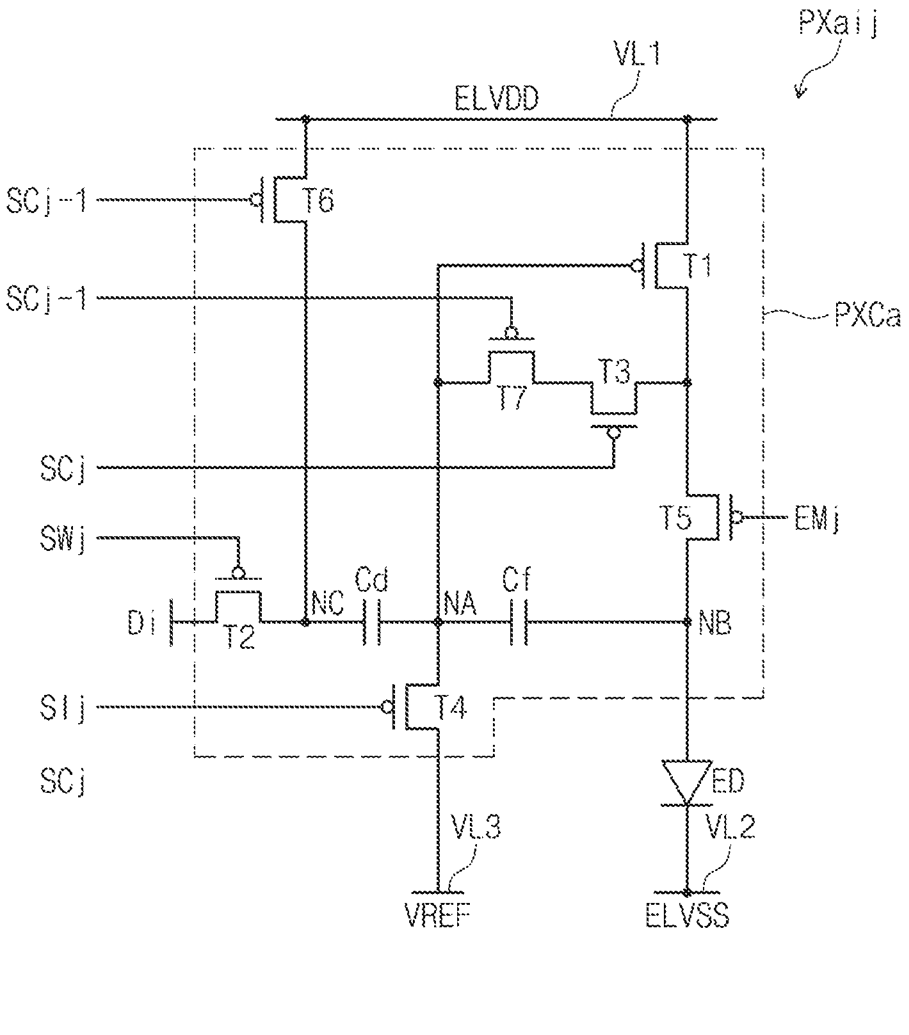
FIG. 9 is a circuit diagram of an embodiment of a pixel, according to the disclosure.

FIG. 9 is a circuit diagram of an embodiment of a pixel, according to the disclosure.

Among the components illustrated in FIG. 9, the same reference numerals are used for the same components as those illustrated in FIG. 2, and additional descriptions thereof will be omitted to avoid redundancy.

Referring to FIG. 9, a pixel PXaij includes a pixel circuit unit PXCa and the light-emitting element ED. The pixel circuit unit PXCa may include seven transistors and two capacitors. However, the disclosure is not limited thereto, and the number of the transistors may be greater than or less than seven and the number of the capacitors may be greater than or less than two in other embodiments. Hereinafter, the seven transistors are also referred to as the first to seventh transistors T1, T2, T3, T4, T5, T6, and T7, respectively, and the two capacitors are also referred to as the first and second capacitors Cf and Cd.

Compared to the pixel circuit unit PXC illustrated in FIG. 2, the pixel circuit unit PXCa according to this embodiment may not include the eighth transistor T8. When the eighth transistor is not included, the emission current Ied of the light-emitting element ED in the fourth period t14 may be affected by a voltage drop component of the second driving voltage ELVSS. However, since a contact process between the eighth transistor T8 and the anode of the light-emitting element ED is omitted, the manufacturing process may be simplified and the circuit may be simplified.

However, even in the pixel PXaij of FIG. 9, the potential of the first node NA may be sufficiently compensated because the second period t12 (i.e., the compensation period) is sufficiently secured regardless of the driving frequency.

Also, even when the duration of the compensation period (i.e., the second period t12) is increased, the current deviation may be decreased through the feedback process occurring in the fourth period. In other words, when the drain current having a different magnitude according to the characteristics of the first transistor T1 is reflected to the second node NB through the turned-on fifth transistor T5 in the fourth period t14, since the first and second nodes NA and NB are coupled through the first capacitor Cf, a change in the second node NB may be reflected back to the gate electrode of the first transistor T1. That is, when the drain current decreases, the potential of the second node NB goes down, and the potential of the first node NA also goes down by coupling through the first capacitor Cf. When the potential of the first node NA goes down, the drain current of the first transistor T1 may increase. In contrast, when the drain current increases, the potential of the second node NB increases, and the potential of the first node NA also increases by coupling through the first capacitor Cf. When the potential of the first node NA increases, the drain current of the first transistor T1 may decrease. Through this feedback process, it is possible to prevent a luminance deviation from occurring due to a current deviation in a relatively high grayscale region.

Figure 10:
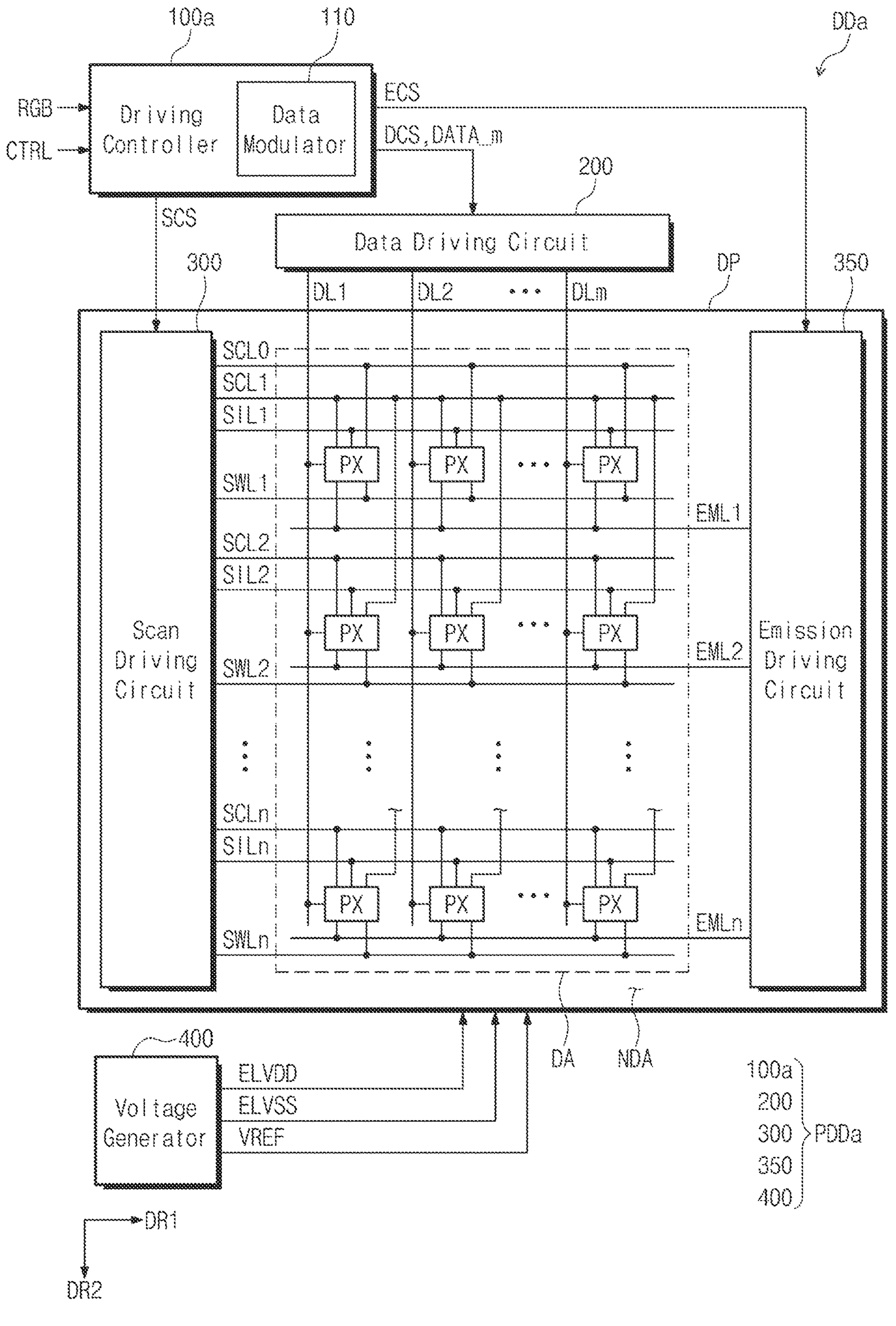
FIG. 10 is a block diagram of an embodiment of a display device, according to the disclosure.
Figure 11:
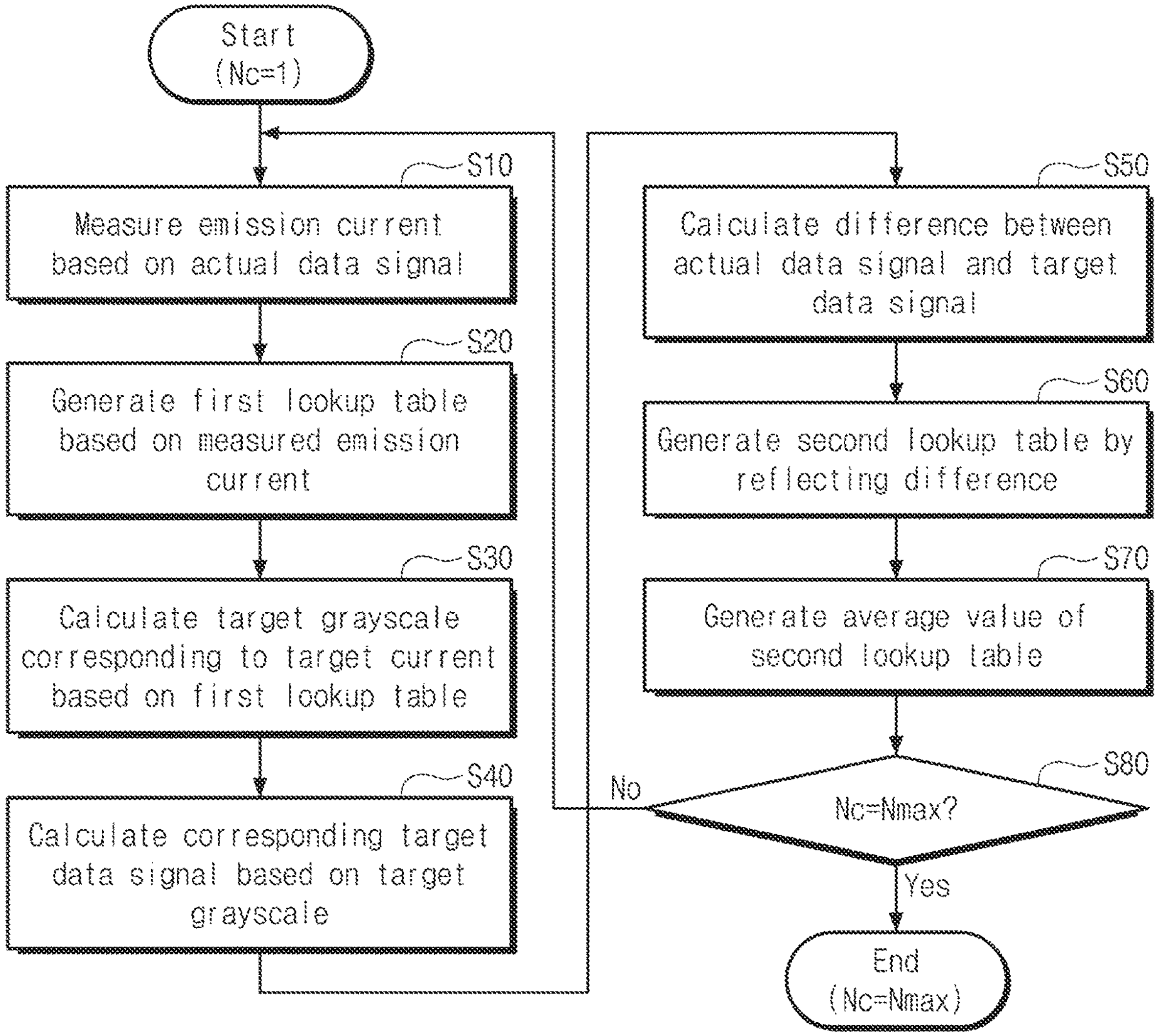
FIG. 11 is a flowchart illustrating an operation process of a data modulator illustrated in FIG. 10.

FIG. 10 is a block diagram of an embodiment of a display device according to the disclosure, and FIG. 11 is a flowchart illustrating an operation process of a data modulator illustrated in FIG. 10. However, among the components illustrated in FIG. 10, the same reference numerals are used for the same components as those illustrated in FIG. 1, and additional descriptions thereof will be omitted to avoid redundancy.

Referring to FIG. 10, a display device DDa in an embodiment of the disclosure includes the display panel DP and a panel driver PDDa driving the display panel DP. In an embodiment of the disclosure, the panel driver PDDa may include a driving controller 100*a*, the data driving circuit 200, the scan driving circuit 300, the emission driving circuit 350, and the voltage generator 400.

The driving controller 100*a* receives the image signal RGB and the control signal CTRL. The driving controller 100*a* generates image data DATA_m obtained by converting a data format of the image signal RGB to meet a specification of an interface with the data driving circuit 200. In an embodiment of the disclosure, the driving controller 100*a* further includes a data modulator 110. The data modulator 110 may measure the emission current Ied (refer to FIG. 7A) for each driving frequency of the selected sample pixels among the plurality of pixels PX, and may modulate the image data by a deviation between the measured emission current Ied and a target current to output the modulated image data DATA_m.

The data driving circuit 200 receives the modulated image data DATA_m and converts it into a data signal. Accordingly, since the data signal based on the modulated image data DATA_m is applied to each pixel PX, each pixel PX may represent the emission luminance corresponding to the target current, and as a result, the luminance deviation for each driving frequency is reduced.

Referring to FIG. 11, the data modulator 110 may perform a sampling operation of measuring the emission current Ied (refer to FIG. 7A) by a preset number of times.

When the measurement is initiated, the number of sampling Nc may be counted. The actual data signal Di is applied to the sample pixels to measure the emission current Ied of each sample pixel (S10). A first lookup table may be generated based on the measured emission current Ied (S20). The first lookup table may be generated based on the emission current Ied measured according to the grayscale (i.e., the actual grayscale) of the data signal applied to each sample pixel. A target grayscale corresponding to a target current may be calculated based on the first lookup table (S30). A corresponding target data signal may be calculated based on the target grayscale (S40). Thereafter, a difference between the target data signal and the actual data signal may be calculated (S50), and a second lookup table may be generated by reflecting the difference (S60). Whenever the number of sampling increases, the data stored in the second lookup tables may be updated with an average value (S70).

Thereafter, it is determined whether the number of sampling Nc is the same as a preset maximum number Nmax (S80). When it is not the same, the operation may be repeated by moving to operation S10, and when it is the same, the sampling operation may be terminated.

Referring back to FIG. 10, the data modulator 110 may generate modulated image data DATA_m by modulating the image data by referring to the second lookup table generated through the sampling operation. Accordingly, a current deviation occurring in each pixel PX as the driving frequency is varied may be improved by modulating the image data.

Figure 12A:
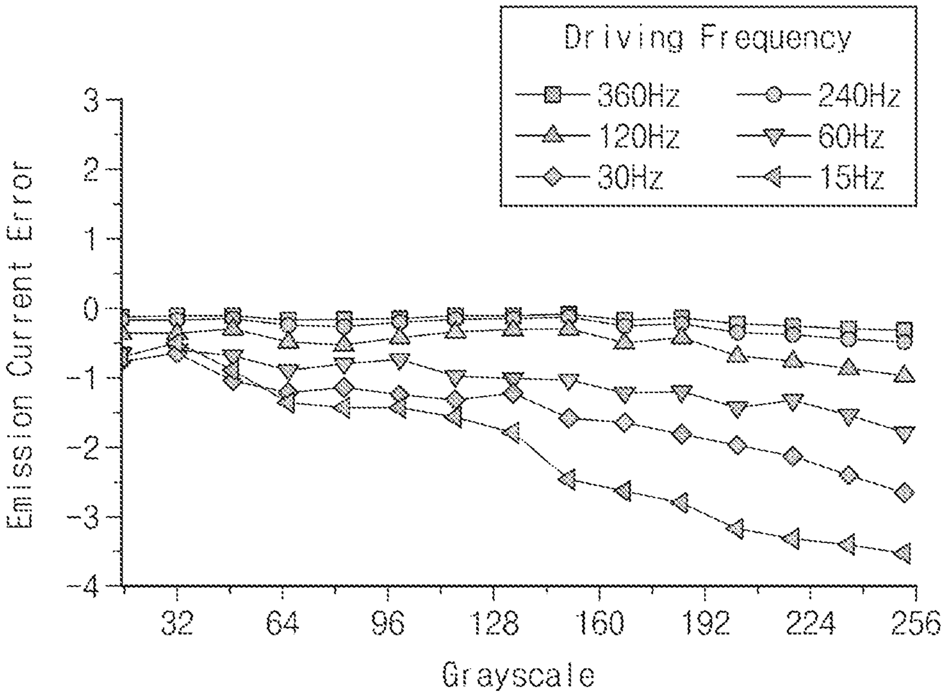
FIGS. 12A and 12B are diagrams illustrating an embodiment of emission current errors for each driving frequency, according to the disclosure.
Figure 12B:
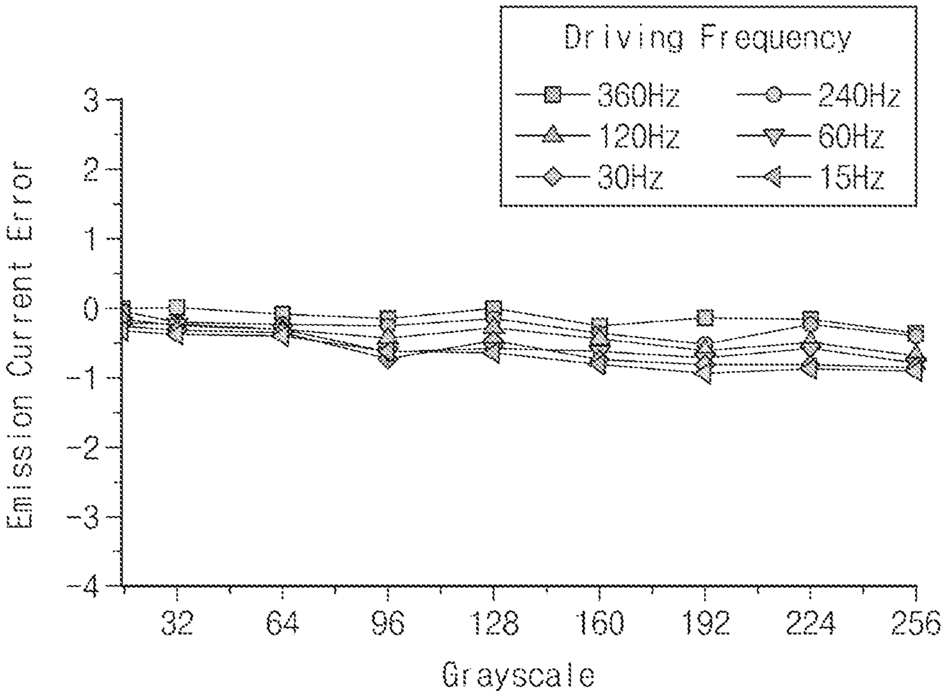

FIG. 12A is a diagram illustrating an emission current error when a data voltage is not modulated according to a driving frequency as in FIG. 1. FIG. 12B is a diagram illustrating an emission current error at a relatively low grayscale when a data voltage is modulated according to a driving frequency as in FIGS. 10 and 11.

Referring to FIG. 12A, when the driving frequencies are 360 Hz, 240 Hz, 120 Hz, 60 Hz, 30 Hz, and 15 Hz, emission current error for each grayscale appears. It is found that the emission current error increases as the driving frequency decreases and the grayscale increases.

Referring to FIGS. 10, 11, and 12B, when image data are modulated through the data modulator 110 (refer to FIG. 10), it is found that the emission current error in the relatively high grayscale region is reduced. That is, it is found that the emission current error does not increase in the relatively high grayscale region even when the driving frequency is lowered. Even when the driving frequency is changed, an emission current error hardly occurs in all grayscale regions, so flicker due to a luminance deviation may not be recognized, and as a result, display quality may be improved.

In an embodiment of the disclosure, it is possible to secure a sufficient compensation period to compensate for a threshold voltage deviation or a threshold voltage change even during high-speed driving, thereby minimizing the current deviation provided to the light-emitting element when a low grayscale image is displayed at a high driving frequency.

In addition, since the potential of a first node is stably maintained even at a relatively low driving frequency, it is possible to prevent a luminance deviation for each driving frequency, and to prevent a phenomenon in which the luminance deviation is recognized as flicker, thereby improving the overall display quality.

Although an embodiment of the disclosure has been described for illustrative purposes, those skilled in the art will appreciate that various modifications, and substitutions are possible, without departing from the scope and spirit of the disclosure as disclosed in the accompanying claims. In addition, the embodiments disclosed in the disclosure are not intended to limit the technical spirit of the disclosure, and all technical ideas within the scope of the following claims and their equivalents should be construed as being included in the scope of the disclosure.

What is claimed is:

1. A display device comprising:

a display panel including a pixel, the pixel including:
- a light-emitting element;
- a first transistor which is connected between a first voltage line which receives a first driving voltage and the light-emitting element, and operates in response to a potential of a first node;
- a second transistor which is connected between a data line and the first node and receives a first scan signal;
- a first capacitor connected between the first node and a second node;
- a third transistor which is connected between the first transistor and the first node and receives a second scan signal;
- a fourth transistor which is connected between a reference voltage line which receives a reference voltage and the first node and receives a third scan signal;
- a fifth transistor which is connected between the first transistor and the second node and receives an emission control signal;
- a sixth transistor which is connected between the first voltage line and a third node and receives a fourth scan signal; and
- a seventh transistor which is connected between the first node and the third transistor and receives a fifth scan signal; and a panel driver which drives the display panel.

2. The display device of claim 1, wherein the third scan signal has an activation level during a first period, and the first and second scan signals and the emission control signal have a deactivation level during the first period.

3. The display device of claim 2, wherein the third scan signal is activated earlier than the second scan signal by a duration of the first period.

4. The display device of claim 1, wherein the pixel further includes a second capacitor connected to the second transistor at the third node and connected between the first node and the third node.

5. The display device of claim 4, wherein the third and fourth scan signals have an activation level during a first period, and wherein the first and second scan signals have a deactivation level during the first period.

6. The display device of claim 5, wherein the second and fourth scan signals have an activation level during a second period subsequent to the first period, and the first and third scan signals have a deactivation level during the second period, and wherein a duration of the second period is greater than a duration of the first period.

7. The display device of claim 6, wherein the first and second scan signals have an activation level during a third period subsequent to the second period, and the third and fourth scan signals have a deactivation level during the third period.

8. The display device of claim 7, wherein the fourth scan signal is deactivated earlier than to the second scan signal by the duration of the first period.

9. The display device of claim 7, wherein the emission control signal has an activation level during a fourth period subsequent to the third period, and the first to fourth scan signals have a deactivation level during the fourth period.

10. The display device of claim 4, wherein the third, fourth and fifth scan signals have an activation level during the first period, and wherein the first and second scan signals have a deactivation level during the first period.

11. The display device of claim 10, wherein the second, fourth, and fifth scan signals have an activation level during a second period subsequent to the first period, and the first and third scan signals have a deactivation level during the second period, and wherein a duration of the second period is greater than a duration of the first period.

12. The display device of claim 4, wherein the light-emitting element includes a cathode which is connected to a second voltage line and receives a second driving voltage and an anode connected to the second node.

13. The display device of claim 12, wherein the pixel further includes an eighth transistor which is connected between the second node and the second voltage line and receives a sixth scan signal.

14. The display device of claim 13, wherein the third and fourth scan signals have an activation level during the first period, and wherein the first, second, and sixth scan signals have a deactivation level during the first period.

15. The display device of claim 14, wherein the second, fourth, and sixth scan signals have an activation level during a second period subsequent to the first period, and the first and third scan signals have a deactivation level during the second period, and wherein a duration of the second period is greater than a duration of the first period.

16. The display device of claim 1, wherein the display panel displays an image during a plurality of frames, and at least one frame among the plurality of frames includes a writing frame and a holding frame, wherein the first to third scan signals have an active level within the writing frame and are maintained in a deactivation level during the holding frame, and wherein the emission control signal has an activation level within the writing frame and the holding frame.

17. The display device of claim 1, wherein the panel driver includes a scan driving circuit which outputs the first to third scan signals; and an emission driving circuit which outputs the emission control signal, and wherein the emission driving circuit operates at a frequency greater than or equal to a frequency of the scan driving circuit.

18. The display device of claim 17, wherein the panel driver further includes a data driving circuit which outputs a data signal to the data line; and a driving controller which controls operations of the scan driving circuit, the emission driving circuit, and the data driving circuit.

19. The display device of claim 18, wherein the driving controller includes a data modulator which modulates image data by a deviation between an emission current measured for each of driving frequencies and a preset target current for each of the driving frequencies, and provides a modulated image data to the data driving circuit.

20. A method of driving a display device for driving a display panel included in the display device and including a plurality of pixels for a plurality of frames including at least one frame among the plurality of frames including a writing frame and at least one holding frame, a number of the at least one holding frame included in the at least one frame being adjusted depending on a driving frequency of the display panel, the method comprising:

applying a scan signal having an activation level to the plurality of pixels within a non-emission period of the writing frame;

applying an emission control signal having an activation level to the plurality of pixels within an emission period of the writing frame;

deactivating the scan signal in the at least one holding frame and applying the emission control signal to the plurality of pixels within an emission period of the at least one holding frame;

measuring emission current at the driving frequency with respect to selected sample pixels among the plurality of pixels;

modulating image data by a deviation between a measured emission current and a target current preset in response to the driving frequency, and generating a data signal based on modulated image data; and applying the data signal to a corresponding pixel among the plurality of pixels within the non-emission period of the writing frame.

* * * * *